United States Patent
Nonaka et al.

(10) Patent No.: US 10,740,892 B2
(45) Date of Patent: Aug. 11, 2020

(54) MEASUREMENT SUPPORT APPARATUS AND MEASUREMENT SUPPORT METHOD

(71) Applicant: FUJIFILM Corporation, Tokyo (JP)

(72) Inventors: Shunichiro Nonaka, Tokyo (JP); Masashi Kuranoshita, Yokohama (JP)

(73) Assignee: FUJIFILM Corporation, Tokyo (JP)

( * ) Notice: Subject to any disclaimer, the term of this patent is extended or adjusted under 35 U.S.C. 154(b) by 140 days.

(21) Appl. No.: 16/015,693

(22) Filed: Jun. 22, 2018

(65) Prior Publication Data

US 2018/0300867 A1 Oct. 18, 2018

Related U.S. Application Data

(63) Continuation of application No. PCT/JP2017/000501, filed on Jan. 10, 2017.

(30) Foreign Application Priority Data

Jan. 15, 2016 (JP) .................................. 2016-005941

(51) Int. Cl.
*G06T 7/00* (2017.01)
*G01B 11/02* (2006.01)
(Continued)

(52) U.S. Cl.
CPC .............. *G06T 7/001* (2013.01); *G01B 11/02* (2013.01); *G01C 11/00* (2013.01);
(Continued)

(58) Field of Classification Search
CPC ....... G06T 7/001; G06T 11/00; G06T 7/0004; G06T 7/60; G06T 7/593; G06T 7/74;
(Continued)

(56) References Cited

U.S. PATENT DOCUMENTS 5,024,523 A * 6/1991 Jerie .................... G09B 29/108
353/11
8,922,647 B2 * 12/2014 Crothers .............. G01B 21/045
348/135
(Continued)

FOREIGN PATENT DOCUMENTS

JP H02-259513 A 10/1990
JP 2002-156212 A 5/2002
(Continued)

OTHER PUBLICATIONS

International Search Report issued in PCT/JP2017/000501; dated Apr. 11, 2017.
(Continued)

*Primary Examiner* — James M Pontius
(74) *Attorney, Agent, or Firm* — Studebaker & Brackett PC

(57) ABSTRACT

A measurement support apparatus includes an image acquisition unit; a scale image generation unit, the scale image representing a scale assigned at least one of gradations for measuring a length of the crack or line drawings and numerals for measuring a width of the crack; and an image display unit that displays the image of the structure and the scale image in a superimposed manner in a display area, in which the scale image generation unit generates a scale image in accordance with a distance between the image acquisition unit and the measurement surface and an orientation of the measurement surface, and the image display unit displays the generated scale image in the superimposed manner at a position according to a position of the crack in the image of the structure in a direction according to a direction of the crack in the image of the structure.

13 Claims, 25 Drawing Sheets

(51) Int. Cl.

| | |
|---|---|
| *G01C 11/00* | (2006.01) |
| *H04N 13/239* | (2018.01) |
| *G01M 5/00* | (2006.01) |
| *G06T 11/00* | (2006.01) |
| *G06T 7/73* | (2017.01) |
| *G06T 7/593* | (2017.01) |
| *G01N 21/88* | (2006.01) |
| *G06T 7/60* | (2017.01) |
| *H04N 5/232* | (2006.01) |
| *E01D 22/00* | (2006.01) |
| *G06T 11/60* | (2006.01) |

(52) U.S. Cl.
CPC ........ *G01M 5/0033* (2013.01); *G01M 5/0075* (2013.01); *G01M 5/0091* (2013.01); *G01N 21/8851* (2013.01); *G06T 7/0004* (2013.01); *G06T 7/593* (2017.01); *G06T 7/60* (2013.01); *G06T 7/74* (2017.01); *G06T 11/00* (2013.01); *H04N 5/23293* (2013.01); *H04N 13/239* (2018.05); *E01D 22/00* (2013.01); *G01N 2021/8883* (2013.01); *G01N 2021/8893* (2013.01); *G01N 2201/06113* (2013.01); *G06T 11/60* (2013.01); *G06T 2207/10012* (2013.01); *G06T 2207/30132* (2013.01)

(58) Field of Classification Search
CPC . G06T 2207/30132; G06T 2207/10012; G06T 11/60; G01M 5/0091; G01M 5/0075; G01M 5/0033; H04N 13/239; H04N 5/23293; G01C 11/00; G01N 21/8851; G01N 2201/06113; G01N 2021/8893; G01N 2021/8883; G01B 11/02; E01D 22/00

See application file for complete search history.

(56) References Cited

U.S. PATENT DOCUMENTS

| | | | |
|---|---|---|---|
| 2011/0221781 A1 | 9/2011 | Okamoto | |
| 2014/0072198 A1* | 3/2014 | Moon | A61B 6/461 |
| | | | 382/131 |
| 2014/0132965 A1 | 5/2014 | Chang et al. | |
| 2018/0180459 A1* | 6/2018 | Takahashi | G06K 9/00671 |
| 2018/0181220 A1* | 6/2018 | Hung | G05B 19/409 |
| 2018/0276848 A1* | 9/2018 | Kasahara | G06T 7/74 |
| 2018/0357779 A1* | 12/2018 | Teittinen | G01C 21/367 |
| 2019/0050401 A1* | 2/2019 | Kikuchi | G01B 11/02 |
| 2019/0137413 A1* | 5/2019 | Constantinis | G01N 21/954 |
| 2019/0332881 A1* | 10/2019 | Hoshino | G06T 7/62 |

FOREIGN PATENT DOCUMENTS

| | | |
|---|---|---|
| JP | 2002-344963 A | 11/2002 |
| JP | 2003-214827 A | 7/2003 |
| JP | 2005-062041 A | 3/2005 |
| JP | 2006-162583 A | 6/2006 |
| JP | 2009-085785 A | 4/2009 |
| JP | 2010-112875 A | 5/2010 |

OTHER PUBLICATIONS

International Preliminary Report on Patentability issued in PCT/JP2017/000501; dated Dec. 18, 2017.

Tomoyuki Yamaguchi; "A Study on Image Processing Method for Crack Inspection of Real Concrete Surfaces"; Major in Pure and Applied Physics, Graduate School of Science and Engineering, Waseda University; Feb. 2008.

An Office Action mailed by the Japanese Patent Office dated Apr. 12, 2019, which corresponds to Japanese Patent Application No. 2017-561115 and is related to U.S. Appl. No. 16/015,693.

\* cited by examiner

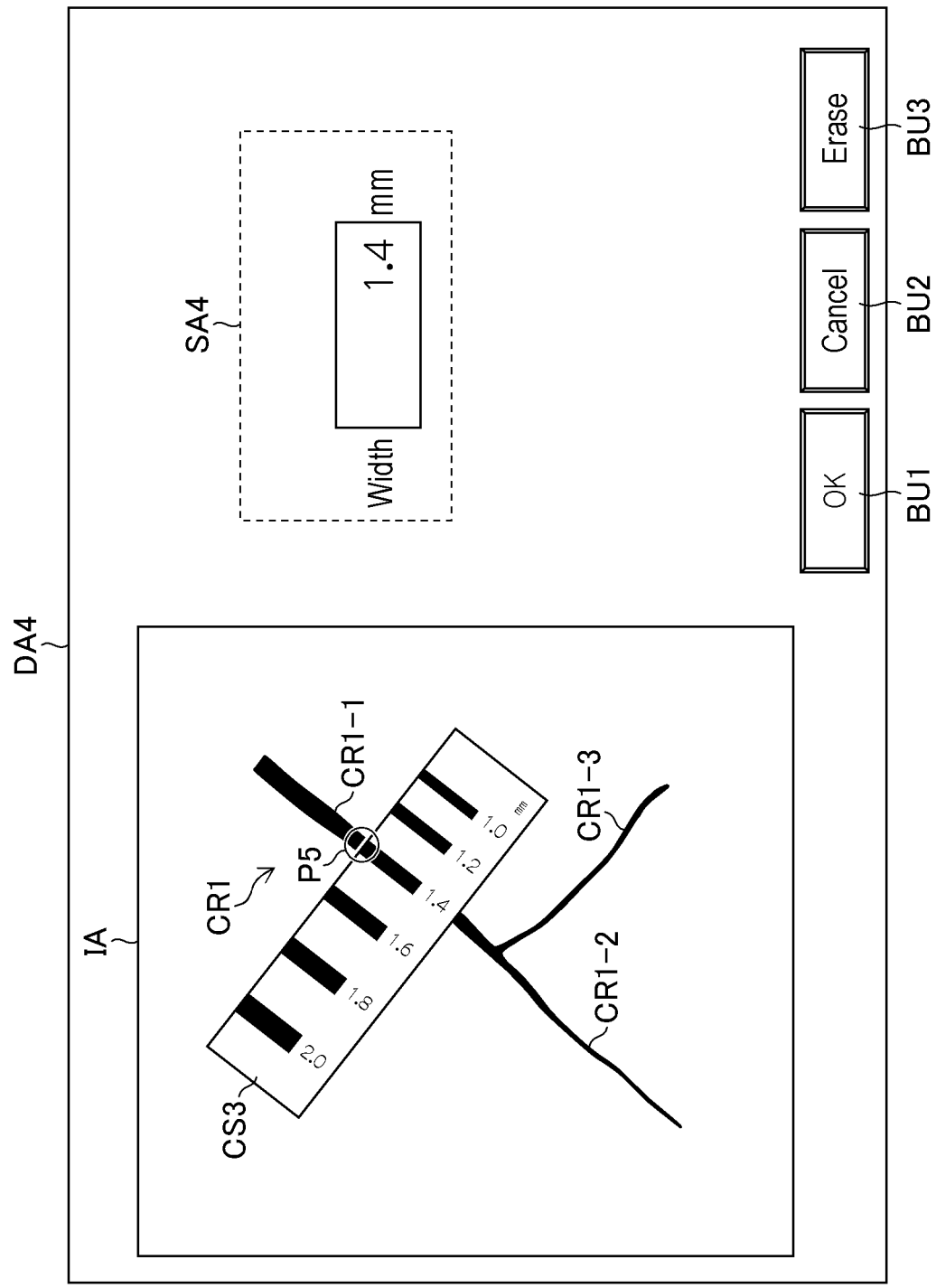

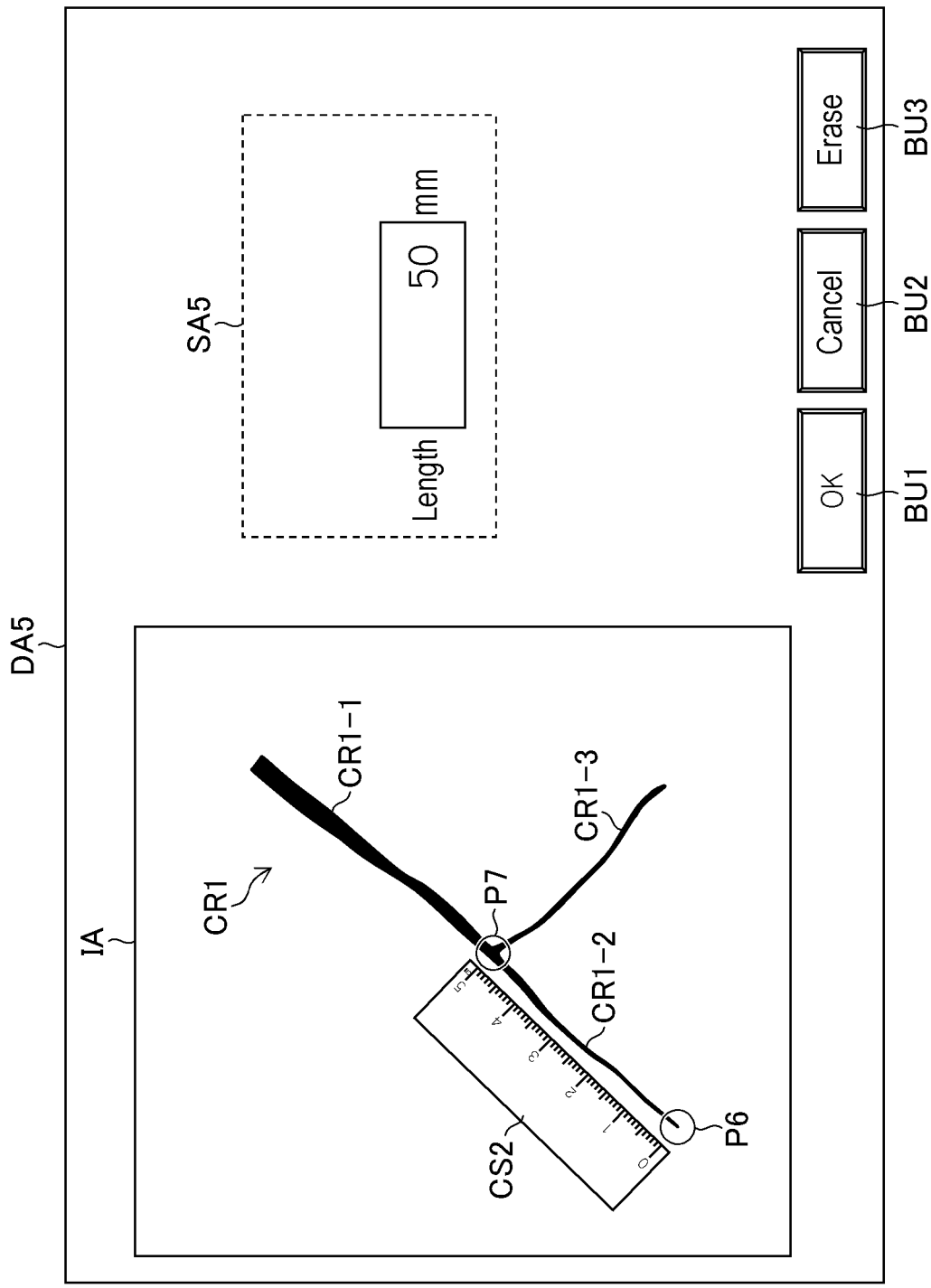

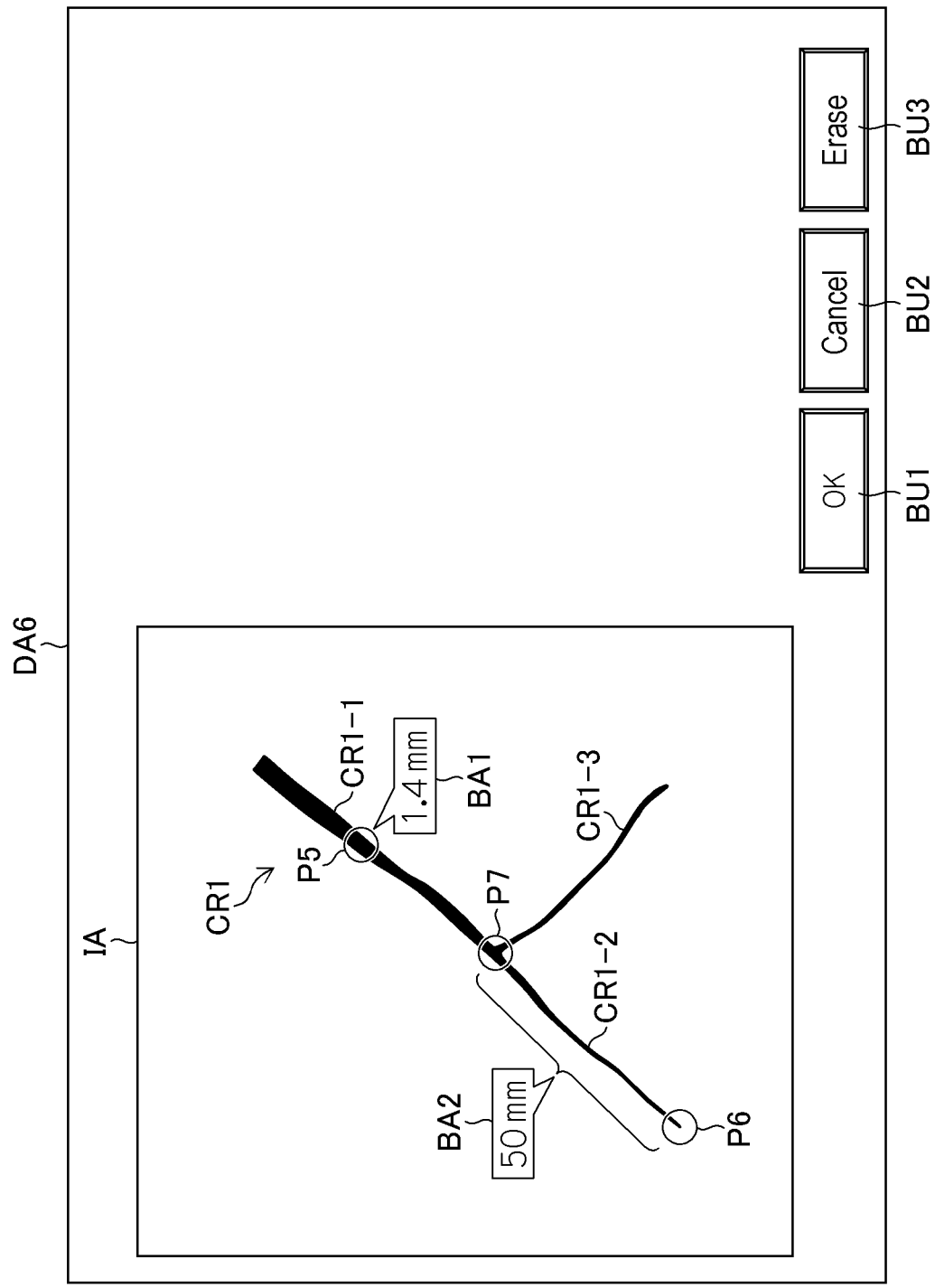

MEASUREMENT SUPPORT APPARATUS AND MEASUREMENT SUPPORT METHOD

CROSS-REFERENCE TO RELATED APPLICATIONS

The present application is a Continuation of PCT International Application No. PCT/JP2017/000501 filed on Jan. 10, 2017 claiming priority under 35 U.S.C § 119(a) to Japanese Patent Application No. 2016-5941 filed on Jan. 15, 2016. Each of the above applications is hereby expressly incorporated by reference, in their entirety, into the present application.

BACKGROUND OF THE INVENTION

1. Field of the Invention

The present invention relates to apparatuses and methods for supporting measurement of a crack on a structure and more particularly to a measurement support apparatus and a measurement support method using a scale image.

2. Description of the Related Art

Various kinds of damage, such as cracks, are caused on structures, such as bridges, tunnels, roads, and buildings, and such damage progresses over time. Thus, to guarantee the safety of the structures, repair needs to be carried out depending on the state of the damage. Damage inspections have been conventionally performed by workers as inspections with their eyes or using tools. However, because of issues regarding the time and cost for the work and environments of the work places, inspections have recently come to be performed using image processing.

For example, JP2003-214827A describes the following. An image including both a crack serving as a measurement target and a crack scale showing markings for known length is captured. The length of the crack is measured from the captured image, and the width of the crack is determined from the area of the crack and the measured length of the crack. In addition, techniques that enable measurement of a crack by displaying an image of such a crack scale to be superimposed on a captured image are known. For example, JP2009-085785A describes the following. A crack scale is displayed to be superimposed on a captured image, and the scale is moved and/or rotated in a structure underfloor inspection system using a moving object.

SUMMARY OF THE INVENTION

Since an image including both a crack and a crack scale is captured in the technique described in JP2003-214827A above, a plurality of crack scales need to be attached to the measurement target or need to be switched between when a crack is measured. Thus, the measurement requires time and effort. In addition, in the case where a person is unable to approach the measurement target, it is difficult to use this technique. The technique described in JP2009-085785A also requires the user to set the display position, display direction, display condition, and the like of the crack scale one by one.

The present invention has been made in view of such circumstances, and an object of the present invention is to provide a measurement support apparatus and a measurement support method that allow a user to measure a crack quickly and easily.

To achieve the aforementioned object, a measurement support apparatus according to a first aspect of the present invention includes an image acquisition unit that acquires an image of a structure; a scale image generation unit that generates a scale image used to measure a crack caused on a measurement surface of the structure, the scale image representing a scale assigned at least one of gradations for measuring a length of the crack or line drawings and numerals for measuring a width of the crack; and an image display unit that displays the image of the structure and the scale image in a superimposed manner in a display area, in which the scale image generation unit generates a scale image in accordance with a distance between the image acquisition unit and the measurement surface and an orientation of the measurement surface, and the image display unit displays the generated scale image in the superimposed manner at a position according to a position of the crack in the image of the structure in a direction according to a direction of the crack in the image of the structure.

With the measurement support apparatus according to the first aspect, a scale image is generated in accordance with the distance between the image acquisition unit and the measurement surface and the orientation of the measurement surface and is displayed in a superimposed manner at the position according to the position of a crack in the direction according to the direction of the crack. This thus saves the time and effort required for approaching the measurement target and attaching the scale to the measurement target and for adjusting the position and the direction of the scale, and consequently enables quick and easy crack measurement. Note that examples of the "structure" include, but not limited to, a bridge, a tunnel, a building, and a road in the first aspect. In addition, the structure may be a concrete structure.

A measurement support apparatus according to a second aspect is the measurement support apparatus according to the first aspect in which the scale image generation unit generates a scale image representing a scale of a type, a shape, and a size according to the distance and the orientation. According to the second aspect, a scale image representing a scale of a type, a shape, and a size according to the distance between the image acquisition unit and the measurement surface and the orientation of the measurement surface is generated and displayed. This thus can reduce the time and effort required for generating a scale image and for setting the display condition of the scale image.

A measurement support apparatus according to a third aspect is the measurement support apparatus according to the second aspect in which the gradations, the line drawings, and the numerals of the scale represented by the scale image change depending on the type, the shape, and the size. Since the third aspect specifically defines the characteristics of the scale image, the third aspect can save the user from setting the display condition of the scale image.

A measurement support apparatus according to a fourth aspect is the measurement support apparatus according to any one of the first to third aspects in which the image display unit displays the scale image in a direction of the crack or in a direction perpendicular to the direction of the crack. In the fourth aspect, for example, the scale image is displayed in a direction of a crack when the length of the crack is measured, whereas the scale image is displayed in a direction perpendicular to the direction of the crack when the width of the crack is measured. Displaying the scale image in this manner can reduce the time and effort required for moving or rotating the displayed scale and consequently allows the user to measure a crack quickly and easily.

A measurement support apparatus according to a fifth aspect is the measurement support apparatus according to any one of the first to fourth aspects including an image operation unit that operates the image of the structure and the scale image in accordance with an input by a user. According to the fifth aspect, the user can operate the scale image in accordance with the purpose of measurement or the characteristics of the measurement target (crack).

A measurement support apparatus according to a sixth aspect is the measurement support apparatus according to the fifth aspect in which the image operation unit operates the scale image along with an operation performed by the image operation unit on the image of the structure. According to the sixth aspect, the scale image is operated along with an operation performed on the image of the structure (captured image). This thus eliminates the necessity of the user operating the image of the structure and the scale image separately and consequently allows the user to measure a crack quickly and easily.

A measurement support apparatus according to a seventh aspect is the measurement support apparatus according to any one of the first to sixth aspects in which the display area includes an image display area in which the image of the structure and the scale image are displayed and a scale information display area in which a plurality of pieces of scale information representing scales of types that are displayable in the image display area are displayed, and the image display unit displays, in the image display area, a scale image corresponding to a piece of scale information selected from among the plurality of pieces of scale information displayed in the scale information display area. According to the seventh aspect, the user can select an appropriate scale image in accordance with a measurement item (such as the length or width of a crack) or a measurement condition (such as the distance or orientation). Note that examples of the scale information include a type, gradations, and line drawings of a scale in the seventh aspect. In addition, the scale information may be displayed in a form of a reduced-size image or an icon or by using characters, numerals, symbols, or the like in accordance with the content thereof.

A measurement support apparatus according to an eighth aspect is the measurement support apparatus according to any one of the first to seventh aspects including an optical system that acquires a stereo image of the structure as the image of the structure; and an image processing unit that calculates the distance and the orientation based on the acquired stereo image. The eighth aspect defines an aspect of a technique for calculating the distance and the orientation of the measurement surface.

A measurement support apparatus according to a ninth aspect is the measurement support apparatus according to the eighth aspect in which the image processing unit detects the position and the direction of the crack from the stereo image, and the image display unit displays the scale image based on the detected portion and direction. The ninth aspect defines that the position and the direction of the crack are detected from a stereo image.

To achieve the aforementioned object, a measurement support method according to a tenth aspect of the present invention includes an image acquisition step of acquiring an image of a structure using an image acquisition device; a scale image generation step of generating a scale image used to measure a crack caused on a measurement surface of the structure, the scale image representing a scale assigned at least one of gradations for measuring a length of the crack or line drawings and numerals for measuring a width of the crack; and an image display step of displaying the image of the structure and the scale image in a superimposed manner in a display area, in which in the scale image generation step, a scale image is generated in accordance with a distance between the image acquisition device and the measurement surface and an orientation of the measurement surface, and in the image display step, the generated scale image is displayed in the superimposed manner at a position according to a position of the crack in the image of the structure in a direction according to a direction of the crack in the image of the structure. According to the tenth aspect, the user can measure a crack quickly and easily as in the first aspect.

As described above, the measurement support apparatus and the measurement support method according to the present invention allow a user to measure a crack quickly and easily.

BRIEF DESCRIPTION OF THE DRAWINGS

FIG. 28 is a diagram illustrating how measurement is performed using a scale image;

FIG. 29 is another diagram illustrating how measurement is performed using a scale image; and FIG. 30 is a diagram illustrating a display example of a measurement result.

DESCRIPTION OF THE PREFERRED EMBODIMENTS

An embodiment of a measurement support apparatus and a measurement support method according to the present invention will be described below with reference to the accompanying drawings.

Figure 1:
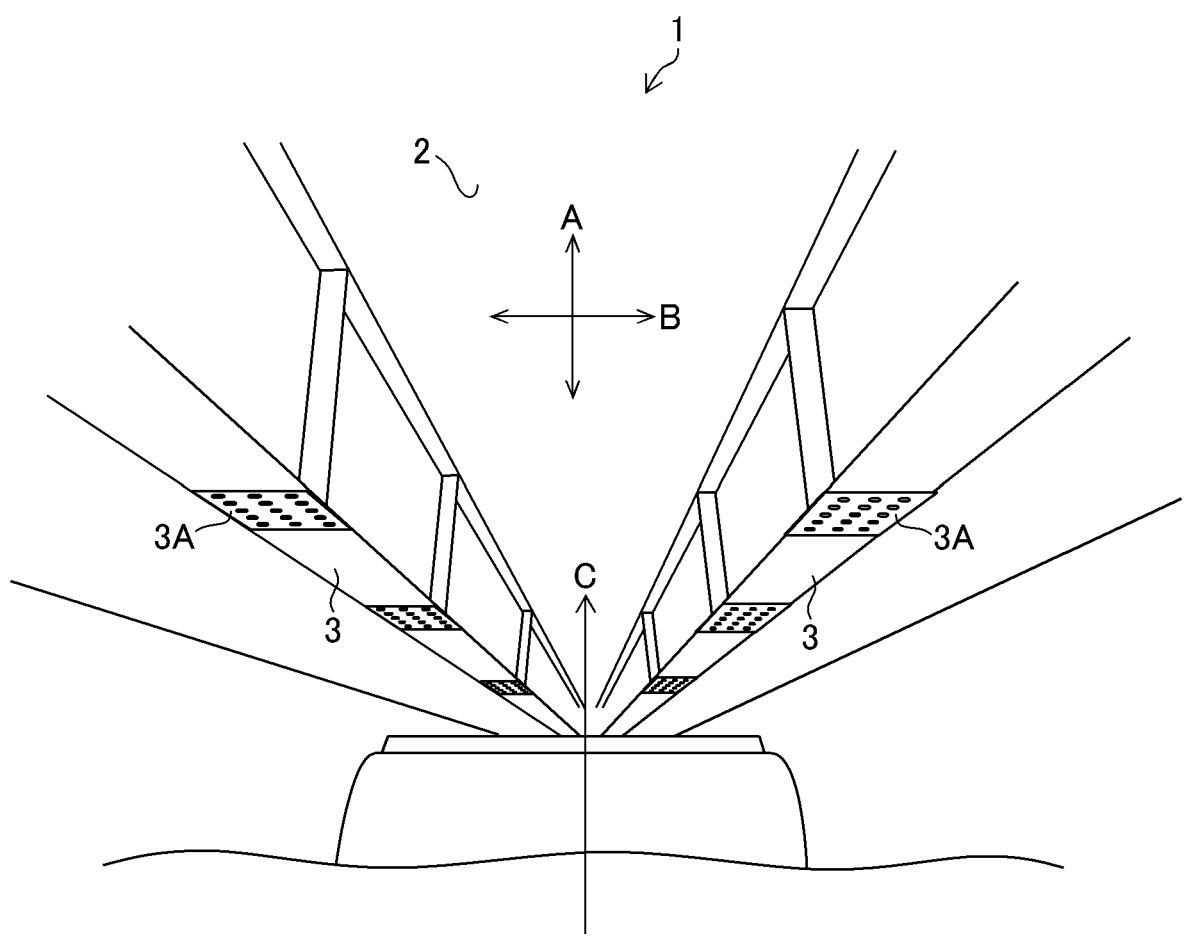
FIG. 1 is a diagram illustrating a bridge that is an example of a structure.

FIG. 1 is a perspective view illustrating the structure of a bridge 1 (concrete structure) that is an example of a target for which the measurement support apparatus and the measurement support method according to the present invention are used. The bridge 1 illustrated in FIG. 1 includes main girders 3. The main girders 3 are joined together by joint portions 3A. The main girders 3 are members that are laid between abutments and piers and that support a load such as vehicles on a deck slab 2. In addition, the deck slab 2, on which vehicles or the like travel, are installed on the main girders 3. A reinforced concrete deck slab is common as the deck slab 2. In addition to the deck slab 2 and the main girders 3, the bridge 1 also includes members, such as cross beams, cross frames, and lateral frames, which are not illustrated.

Acquisition of Image

When damage of the bridge 1 is measured, an inspector captures images of the bridge 1 from below (in a direction C in FIG. 1) using a digital camera 104 (see FIG. 2) to acquire images of an inspection range. The inspector performs image capturing while moving in a stretching direction of the bridge 1 (in a direction A in FIG. 1) and its perpendicular direction (in a direction B in FIG. 1) if necessary. When it is difficult for the inspector to move because of the circumstance around the bridge 1, the digital camera 104 may be installed on a moving object capable of moving along the bridge 1 to capture images. Such a moving object may be equipped with a mechanism for ascending and descending the digital camera 104 and/or a mechanism for panning and tilting the digital camera 104. Examples of the moving object include, but not limited to, a vehicle, a robot, and a flying object.

Configuration of Measurement Support Apparatus

Figure 2:
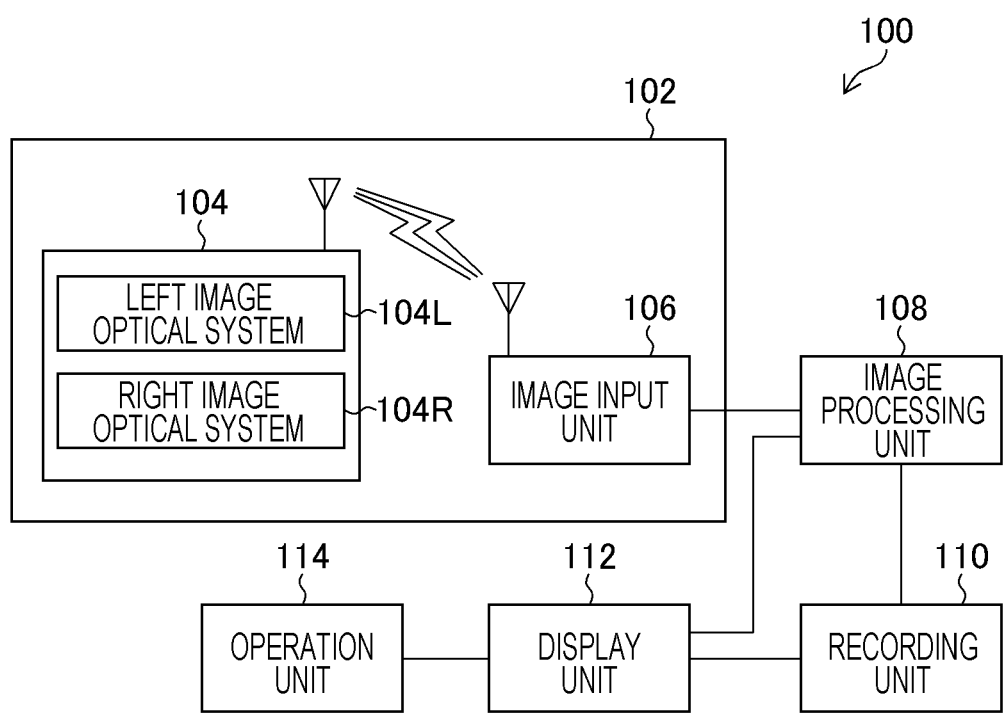
FIG. 2 is a block diagram illustrating a configuration of a measurement support apparatus according to an embodiment of the present invention.

FIG. 2 is a block diagram illustrating a schematic configuration of a measurement support apparatus 100 according to the embodiment. The measurement support apparatus 100 includes an image acquisition unit 102 (an image acquisition device), an image processing unit 108 (a scale image generation unit, an image display unit, and an image operation unit), a recording unit 110, a display unit 112 (the image display unit), and an operation unit 114. These units are connected to each other and are able to send and receive necessary information.

A function of each of the aforementioned units can be implemented as a result of a control device such as a CPU (Central Processing Unit) executing a program stored in a memory. In addition, an image input unit 106 includes a wireless communication antenna and an input/output interface circuit. The recording unit 110 includes a non-transitory recording medium, such as an HDD (Hard Disk Drive). Further, the display unit 112 includes a display device, such as a liquid crystal display. The operation unit 114 includes an input and operation device, such as a keyboard or a mouse. Note that these show an example of the configuration of the measurement support apparatus according to the present invention, and another configuration may be appropriately adopted.

An image captured using the digital camera 104 (the image acquisition device) in a manner as described above is input to the image input unit 106 via wireless communication. A measurement process (described later) is performed on the image by the image processing unit 108. The digital camera 104 and the image input unit 106 constitute the image acquisition unit 102. The digital camera 104 includes a left image optical system 104L for acquiring a left-eye image and a right image optical system 104R for acquiring a right-eye image. The digital camera 104 is capable of acquiring a stereo image by capturing images of a single photographic subject (the bridge 1 in this embodiment) from a plurality of points of view using these optical systems. The left image optical system 104L and the right image optical system 104R each include an image-capturing lens and an imaging element, which are not illustrated. Examples of the imaging element include a CCD (Charge Coupled Device) imaging element and a CMOS (Complementary Metal-Oxide Semiconductor) imaging element. A color filter of R (red), G (green), and B (blue) is provided on a light-receiving surface of the imaging element. A color image of the photographic subject can be acquired based on signals of the respective colors.

Procedure of Measurement

Figure 3:
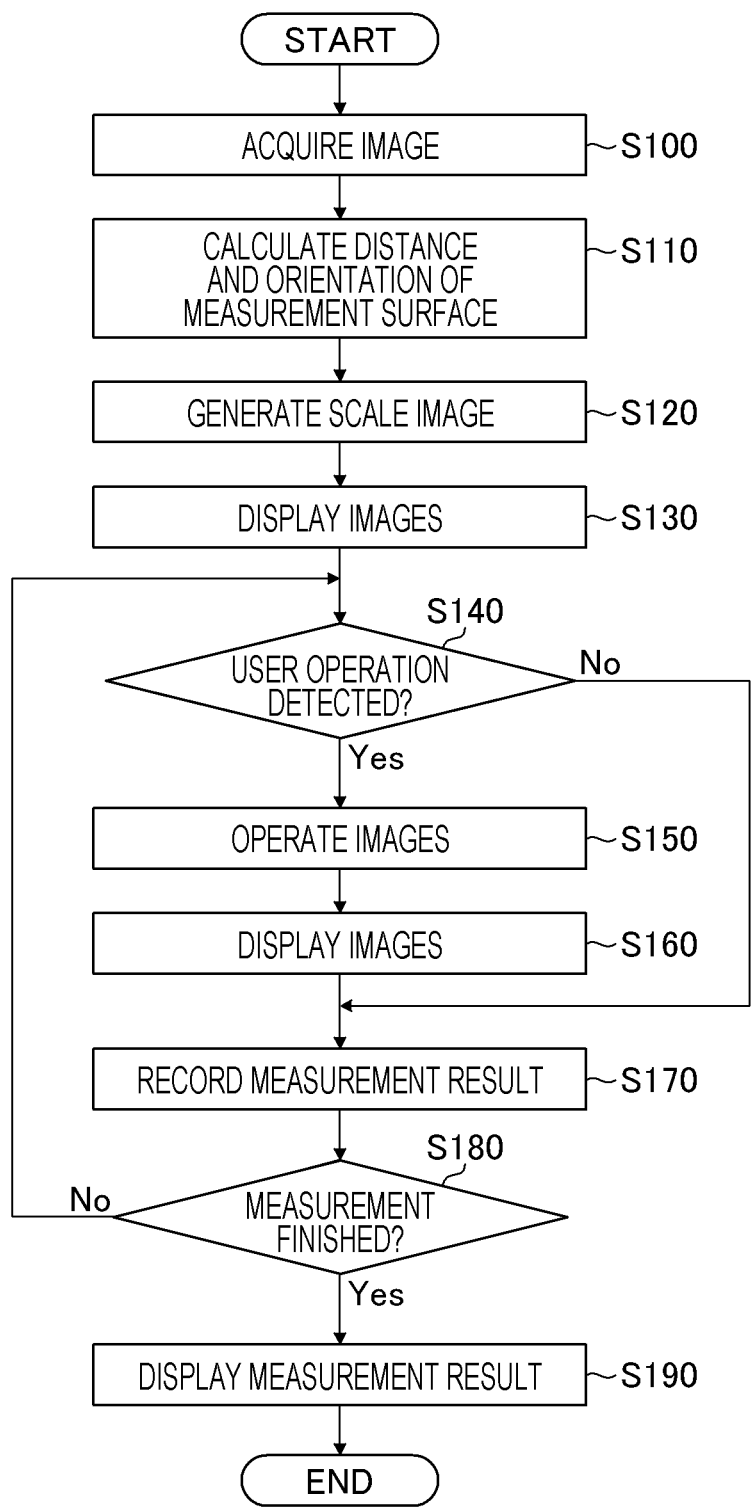
FIG. 3 is a flowchart illustrating a process of a measurement support method according to the embodiment of the present invention.

Measurement of a crack using the measurement support apparatus 100 having the above-described configuration will be described next. FIG. 3 is a flowchart illustrating a procedure of measurement (a measurement support method) according to the embodiment. Note that the case of measuring a crack caused on the deck slab 2 of the bridge 1, which is a concrete structure, will be described in this embodiment.

Image Acquisition

First, a stereo image of the bridge 1 captured using the digital camera 104 in the above-described manner is input to the image input unit 106 via wireless communication (step S100; an image acquisition step). A plurality of images of the bridge 1 are input depending on the inspection range. Information concerning the image-capturing date and time is attached to the input images by the digital camera 104. Note that the image-capturing date and time of the input images needs not necessarily be the same for all the images and may indicate a plurality of dates. The plurality of images may be collectively input or may be input one at a time. In addition, instead of inputting the captured images without any processing, an image obtained by performing image processing, such as editing and/or combining (for example, an image representing the entire inspection range that is generated by combining captured images of parts of the inspection range) may be input. In the following description, an image obtained by performing such image processing is also referred to as a "captured image" as long as the image is an image acquired by image capturing of a structure. Note that images of the bridge 1 may be input via non-transitory recording media, such as various kinds of memory cards, instead of using wireless communication, or data of images that have already been captured and recorded may be input via a network.

Distance and Orientation of Measurement Surface

Next, a distance and an orientation of a measurement surface where a crack is present are calculated based on the stereo image acquired in step S100 (step S110). In this embodiment, since the stereo image of the bridge 1 is input in step S100, parallax can be calculated at each pixel position from the input stereo image and the orientation of the measurement surface can be calculated based on the calculated parallax. Note that, in step S110, a distance between the digital camera 104 and the measurement surface can be set as the distance of the measurement surface, and the orientation of the measurement surface with respect to the image-capturing direction of the stereo image acquired in step S100) can be set as the orientation of the measurement surface. Instead of using the stereo image acquired using the digital camera 104, the distance and the orientation of the measurement surface may be measured using a so-called TOF (Time Of Flight) method in which pulsed light is emitted from a digital camera including a light source, reflected light of the pulsed light is received, and the distance and the orientation of the measurement surface are calculated based on the received reflected light.

Generation of Scale Image

Then, the image processing unit 108 (the scale image generation unit) generates a scale image (step S120; a scale image generation step). A scale image is an image representing a scale (crack scale) assigned at least one of gradations for measuring the length of a crack or line drawings and numerals for measuring the width of the crack. The image processing unit 108 generates a scale image of a type, a shape, and a size according to the distance and the orientation calculated in step S110. The gradations, the line drawings, and the numerals of this scale image change depending on the type, the shape, and the size. In addition, the image processing unit 108 displays the scale image thus generated on the display unit 112 (details about displaying of the image will be described later).

Relationship Between Distance of Measurement Surface and Scale Image

Figure 4:
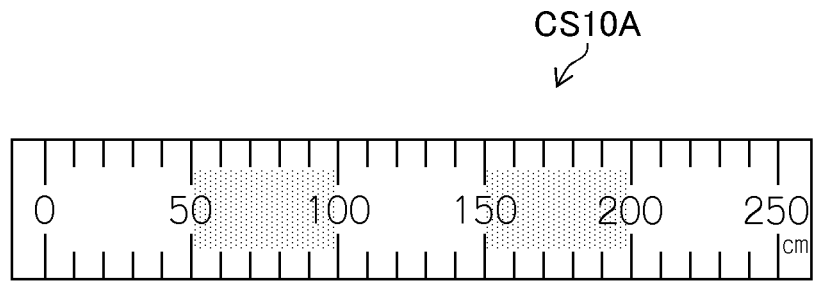
FIG. 4 is a diagram illustrating an example of a scale image according to a distance of a measurement surface.
Figure 5:
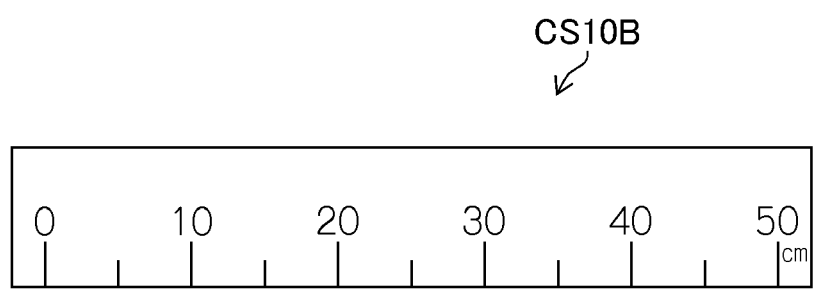
FIG. 5 is another diagram illustrating an example of a scale image according to the distance of the measurement surface.
Figure 6:
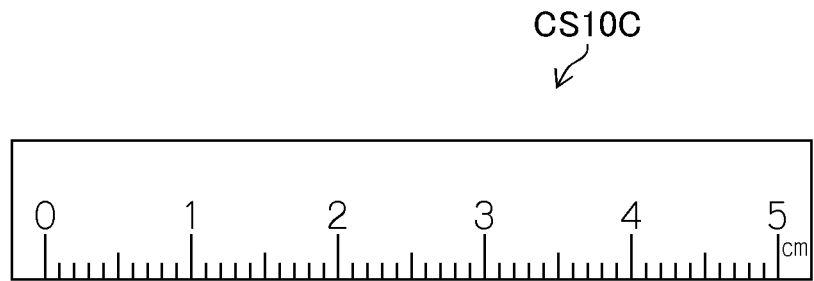
FIG. 6 is still another diagram illustrating an example of a scale image according to the distance of the measurement surface.

FIGS. 4 to 7 each illustrate an example of the scale image according to the distance. FIG. 4 is a diagram illustrating a scale image CS10A used in the case where the measurement surface is far. A long crack can be measured at once using such a scale image CS10A. FIGS. 5 and 6 are diagrams illustrating scale images CS10B and CS10C used in the cases where the distance to the measurement surface is intermediate and short, respectively. The scale images illustrated in these figures are assigned gradations and numerals such that a shorter crack than that for the scale image CS10A illustrated in FIG. 4 can be measured.

Figure 7:
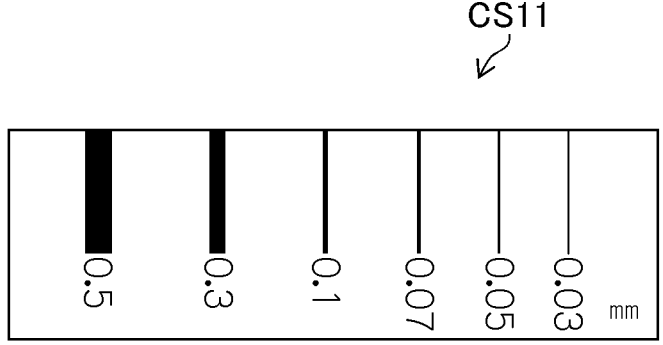
FIG. 7 is still another diagram illustrating an example of a scale image according to the distance of the measurement surface.

FIG. 7 is a diagram illustrating a scale image CS11 used in the case of a closer range than that of FIG. 6. When an image of a single crack is captured in the same conditions, the crack appears to be thicker and becomes more suitable for measurement of the width as the distance to the measurement surface decreases. Thus, in the example of FIG. 7, the scale image CS11 for width measurement is generated and displayed when the distance is less than or equal to a predetermined value. In the scale image CS11, line drawings (lines of different thicknesses) and numerals for width measurement are configured such that the line drawings have thicknesses corresponding to the respective numerals. The width can be measured by placing each of the line drawings at the crack and by reading the numeral of the line drawing whose width matches the width of the crack.

Each of FIGS. 4 to 7 merely illustrates an example of the scale image. That is, the configuration of the scale image and the relationship between the scale image and the distance in the present invention are not limited to these examples. For example, a scale image for length measurement may be displayed for distances corresponding to the state in FIG. 7. In addition, each of FIGS. 4 to 7 illustrates an example of the scale image assigned one of information for length measurement (gradations and numerals) and information for width measurement (line drawings and numerals). However, both of the pieces of information may be assigned to a scale image, and such a scale image may be displayed. The same applies to displaying of the image described later.

Relationship Between Orientation of Measurement Surface and Scale Image

Figure 8:
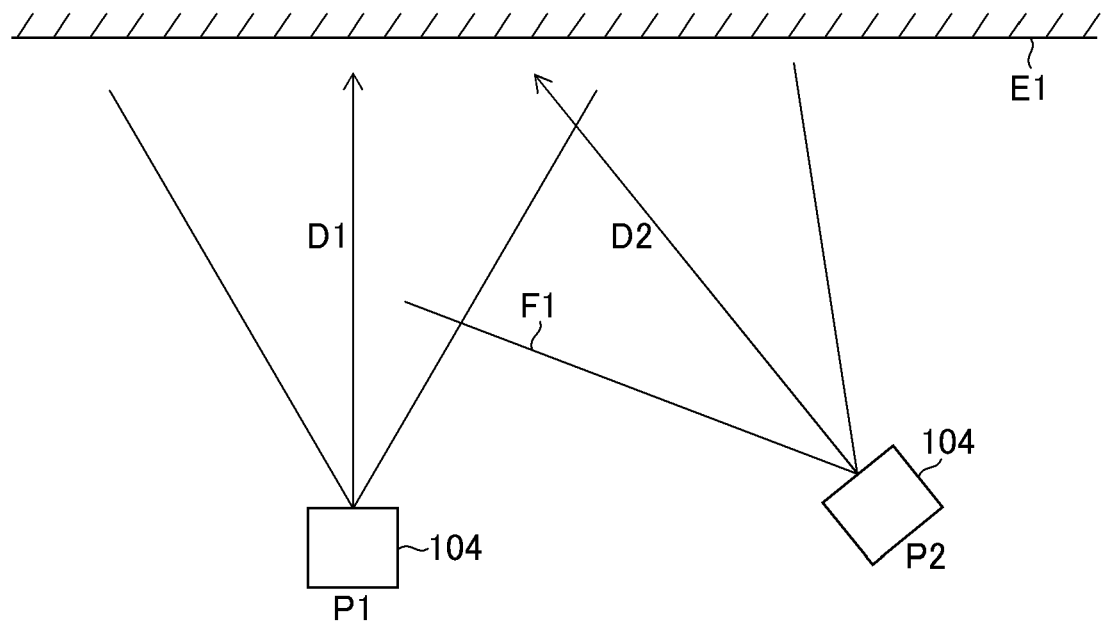
FIG. 8 is a diagram illustrating a distance and an orientation of the measurement surface.

Next, a relationship between the orientation of the measurement surface and the scale image will be described. FIG. 8 is a diagram illustrating an image-capturing position and an image-capturing direction of the digital camera 104. Note that it is assumed that a measurement surface E1 is in a direction perpendicular to the paper surface in FIG. 8.

Figure 9:
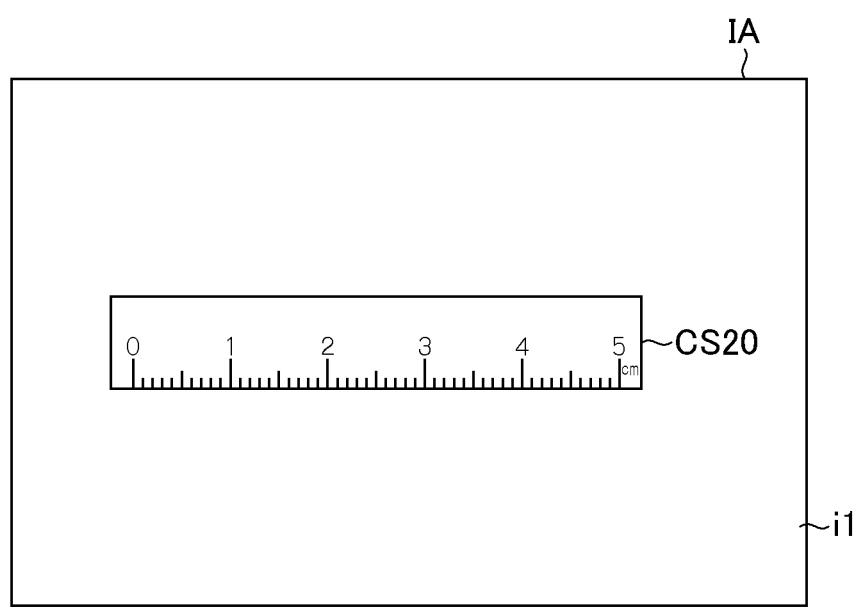
FIG. 9 is a diagram illustrating a display example of the scale image in the case where the measurement surface faces straight.
Figure 10:
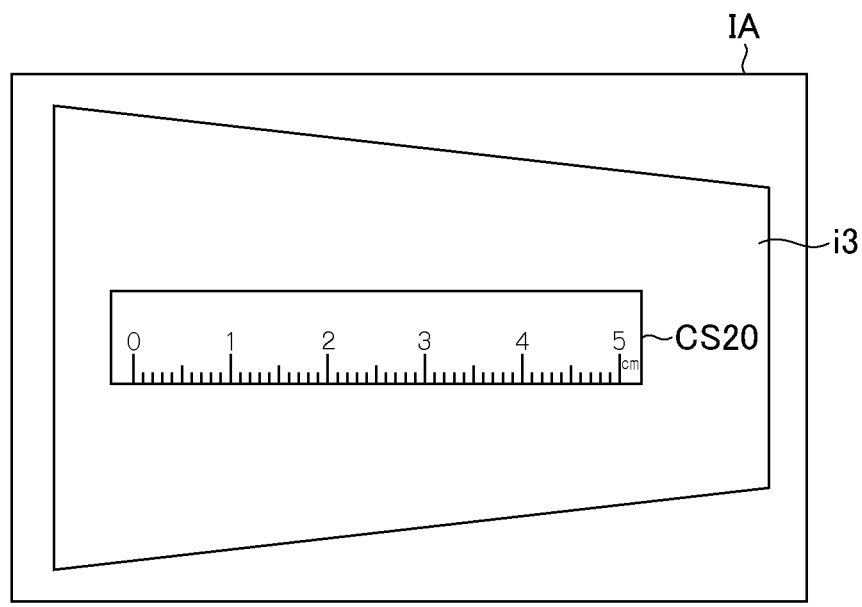
FIG. 10 is a diagram illustrating a display example of the scale image in the case where the measurement surface is tilted.

Referring to FIG. 8, when the digital camera 104 performs image capturing right in front of the measurement surface E1 (at a position P1 in an image-capturing direction D1), a quadrangular area on the measurement surface E1 is quadrangular in a captured image i1. Thus, in this case, a quadrangular scale image CS20 may be displayed in an image display area IA (step S130 described later; the same applies to the following) as illustrated in FIG. 9. On the other hand, when the digital camera 104 performs image capturing in a diagonal direction with respect to the measurement surface E1 (at a position P2 in an image-capturing direction D2), a quadrangular area on the measurement surface E1 becomes trapezoidal in a captured image. In this case, the quadrangular scale image CS20 can be displayed by performing correction (projective transformation) on a captured image i3 into an image captured from right in front as illustrated in FIG. 10. However, the resultant image may become an unclear image in which only a part of the image-capturing range is in focus and the rest is conspicuously out of focus (consequently, it may become difficult to measure a crack or the accuracy may decrease). For example, it is conceivable that the central portion of the image-capturing range is in focus but the out-of-focus state is conspicuous around an end portion F1 of the image-capturing range.

Figure 11:
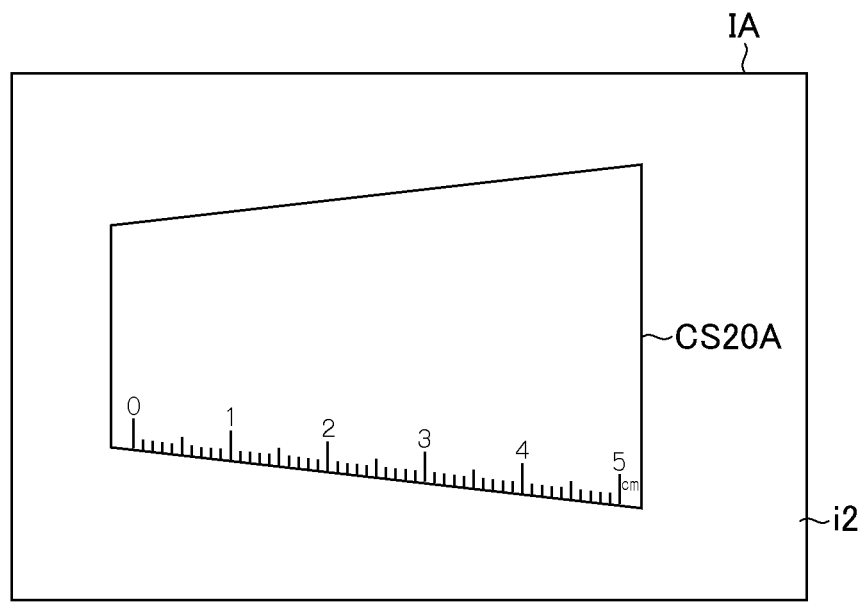
FIG. 11 is another diagram illustrating a display example of the scale image in the case where the measurement surface is tilted.

From such a point of view, no correction is performed on a captured image i2 in this embodiment as illustrated in FIG. 11, and a scale image CS20A that is deformed in accordance with the orientation of the measurement surface E1 (the orientation of the measurement surface E1 with respect to the image-capturing direction D2 of the captured image i2)

is displayed. FIG. 11 illustrates an example of the case where the digital camera 104 performs image capturing at the position P2 in the image-capturing direction D2 in FIG. 8. The distance from the digital camera 104 increases toward the left side (distal side) from the right side (proximal side) in FIGS. 8 and 11. Thus, the scale image CS20A is also deformed so that the width thereof is wide on the right side and decreases toward the left side. As described above, since correction (projective transformation) is not performed on the captured image i2 in this embodiment, image degradation such as an increased degree of out-of-focus due to image processing does not occur. Thus, a crack can be measured while maintaining the image quality of the captured image i2.

Note that both the switching of the displayed scale image in accordance with the distance as illustrated in FIGS. 4 to 7 and the deformation of the displayed scale image in accordance with the orientation as illustrated in FIG. 11 may be performed together. That is, the scale image whose type is switched in accordance with the distance of the measurement surface and which is deformed in accordance with the orientation of the measurement surface may be displayed.

Displaying of Captured Image and Scale Image

After generating the scale image according to the distance and the orientation of the measurement surface in step S120, the image processing unit 108 displays the captured image and the scale image in the image display area IA of the display unit 112 in a superimposed manner (step S130; an image display step). Displaying of the captured image and the scale image will be described below. Note that the description will be given of the case of displaying a crack CR1 constituted by three cracks CR1-1 to CR1-3 in the example below.

Figure 12:
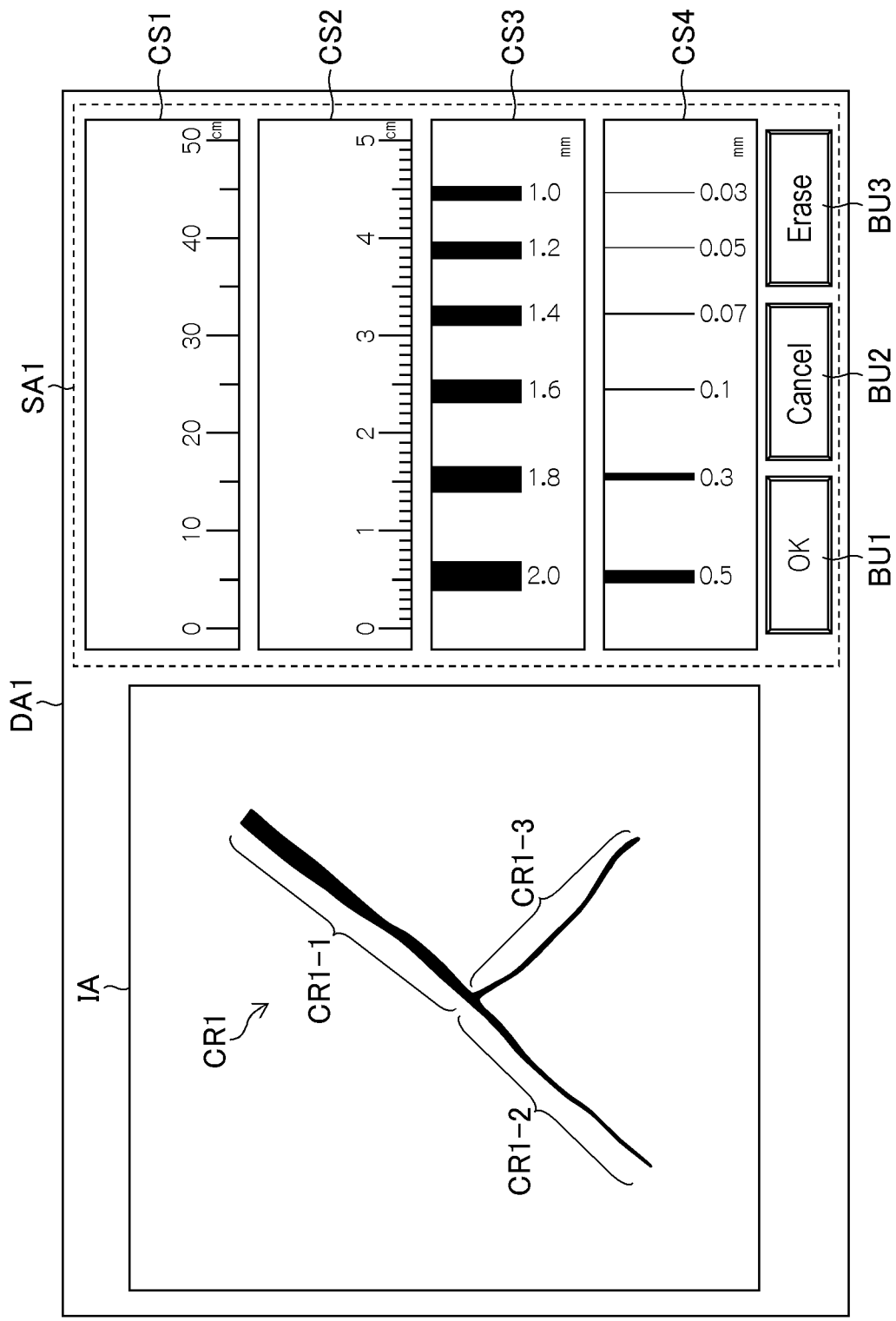
FIG. 12 is a diagram illustrating an example in which an image of a crack is displayed in a display area.

FIG. 12 is a diagram illustrating an example of an image displayed on the display unit 112. Referring to FIG. 12, a display area DA1 includes the image display area IA and a scale information display area SA1. The image display area IA is an area in which the captured image and the scale image are displayed. The scale information display area SA1 is an area in which pieces of scale information representing scales of types that are displayable in the image display area IA are displayed. Scale images (reduced-size images) are displayed as the pieces of scale information in FIG. 12. Instead of or in addition to such reduced-size images, characters, numerals, and symbols representing the scale images may be displayed. In addition to the pieces of scale information, an OK button BU1 for confirming selection of a scale image, a cancel button BU2 for cancelling the selection, and an erase button BU3 for erasing the scale image displayed in the image display area IA are displayed in the scale information display area SA1. These buttons can be operated using an operation device, such as a mouse, included in the operation unit 114. Note that the scale image may be selected and displayed automatically by the image processing unit 108 in accordance with the distance and the orientation of the measurement surface in the default state and may be changed in accordance with a user operation.

In the example of FIG. 12, scale images CS1 to CS4 (reduced-size images) representing scales for length measurement and scales for width measurement are displayed in the scale information display area SA1. The scale images CS1 and CS2 represent scales for length measurement, and the scale images CS3 and CS4 represent scales for width measurement. The types (whether the type for length measurement or for width measurement and information such as gradations, line drawings, and numerals) of the scale images displayed in the scale information display area SA1 may be changed in accordance with the distance of the measurement surface.

Manner of Displaying Scale Image in Direction Along Direction of Crack

Figure 13:
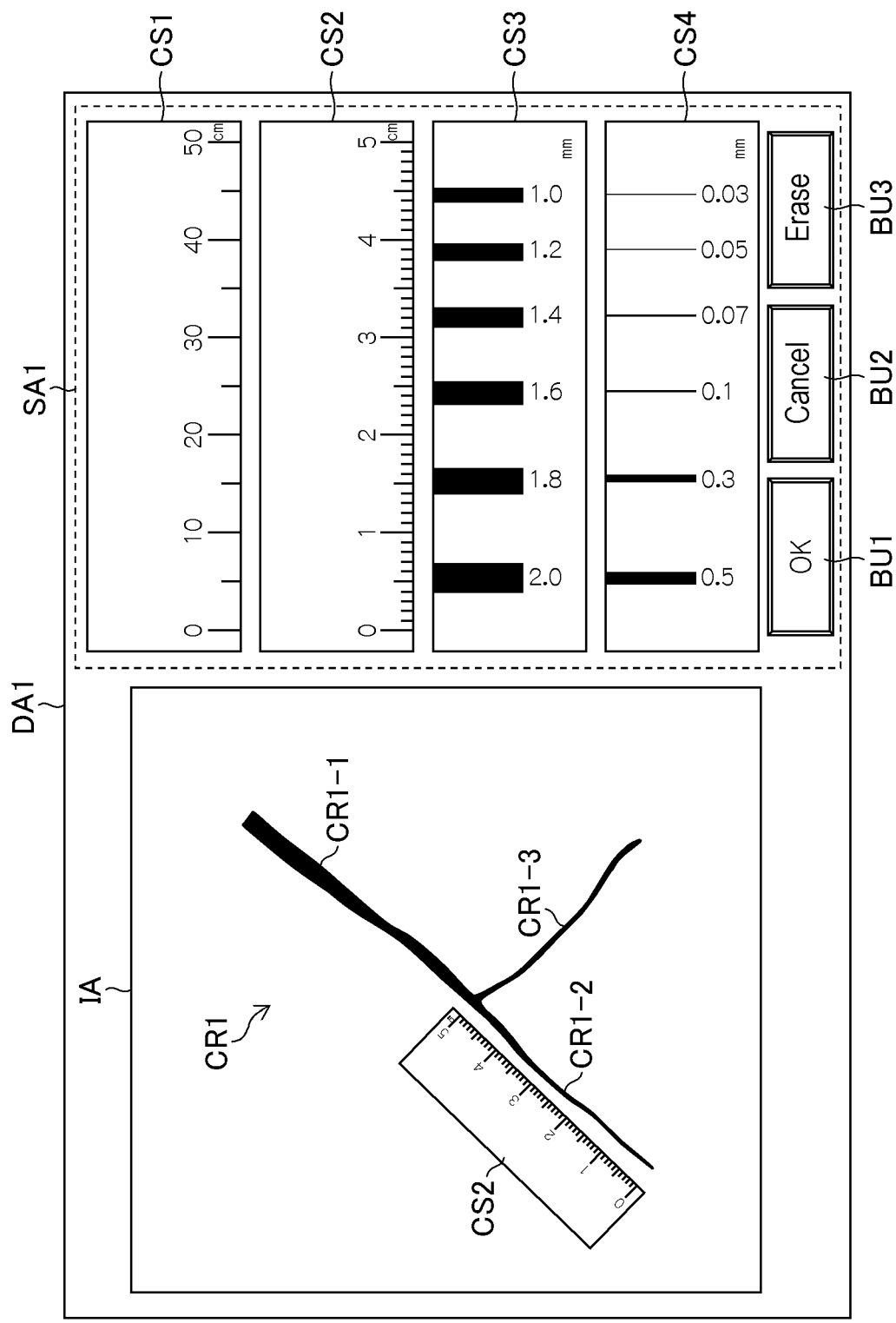
FIG. 13 is a diagram illustrating an example in which an image of a crack and a scale image are displayed in a superimposed manner.

FIG. 13 is a diagram illustrating an example in which a captured image and a scale image are displayed in a superimposed manner. FIG. 13 illustrates an example in which the scale image CS2 representing a scale for length measurement is selected and is displayed near the crack CR1-2 in a length direction of the crack CR1-2. The length of the crack CR1-2 can be measured by reading the gradation of the scale image CS2. Note that the description will be given of the case where the image-capturing direction faces the measurement surface straight in the examples of FIG. 13 and the following figures. In the case where the image-capturing direction does not face the measurement surface straight, the scale image can be displayed after being deformed in accordance with the orientation of the measurement surface as in the example of FIG. 11.

Figure 14:
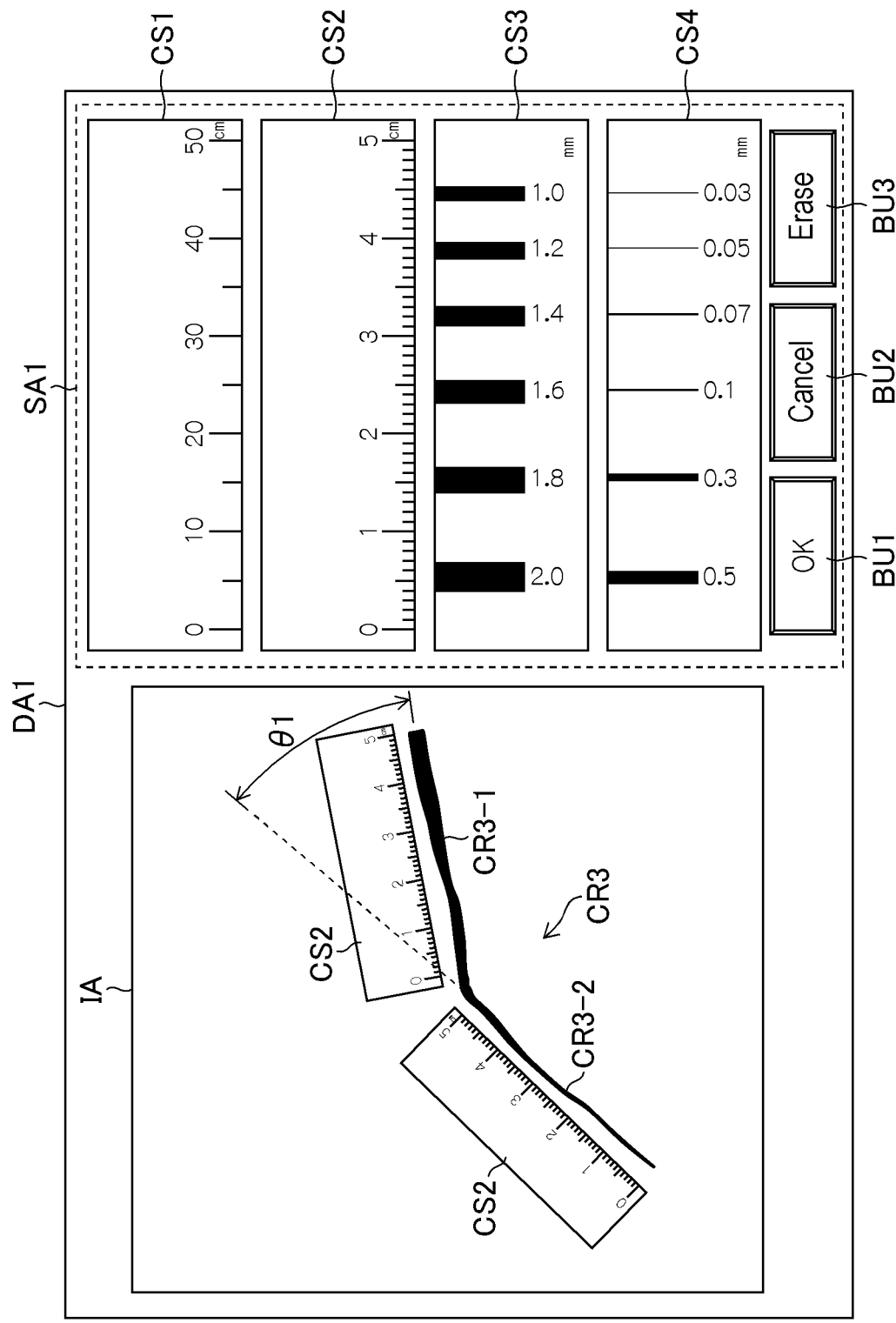
FIG. 14 is another diagram illustrating an example in which an image of a crack and scale images are displayed in a superimposed manner.
Figure 15:
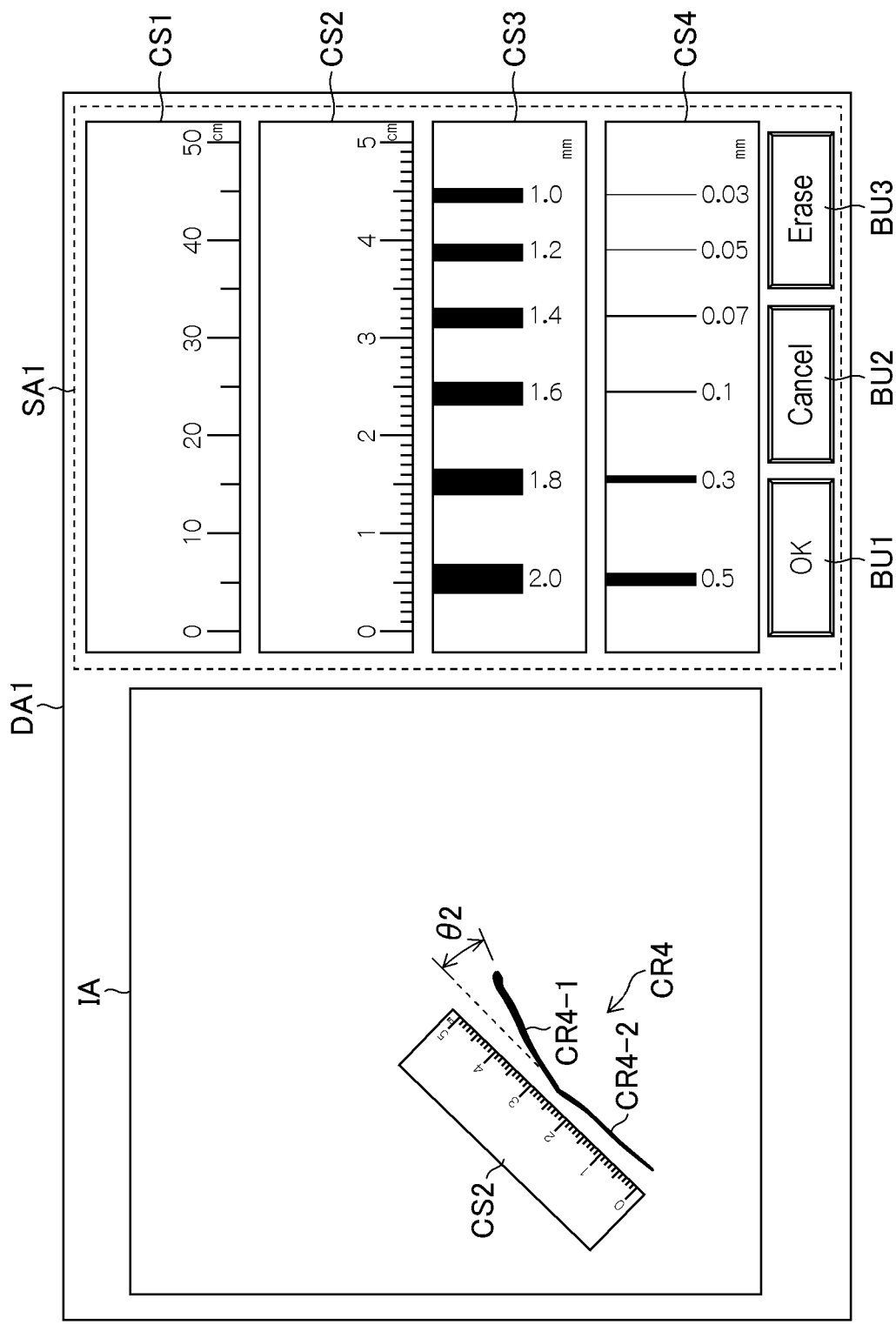
FIG. 15 is still another diagram illustrating an example in which an image of a crack and a scale image are displayed in a superimposed manner.

Cracks include not only a continuous linear crack but also a bending crack, a discontinuous crack, and a branching crack. The following examples show how the scale image(s) is (are) displayed in such cases. FIG. 14 is a diagram illustrating another display example of scale images in the case where a crack bends. In FIG. 14, since a crack CR3 bends by a large amount (an angle θ1 between cracks CR3-1 and CR3-2 is large), the scale image CS2 is displayed for each of the cracks CR3-1 and CR3-2. On the other hand, in the example of FIG. 15, since the amount by which a crack CR4 bends is small (an angle θ2 between cracks CR4-1 and CR4-2 is small), one scale image CS2 is displayed. That is, a threshold value may be provided for an angle between cracks. If the angle is greater than or equal to the threshold value, the scale images may be displayed individually as illustrated in FIG. 14. If the angle is less than the threshold value, one scale may be displayed as illustrated in FIG. 15. The threshold value can be, but not limited particularly to, 30 degrees, for example.

Figure 16:
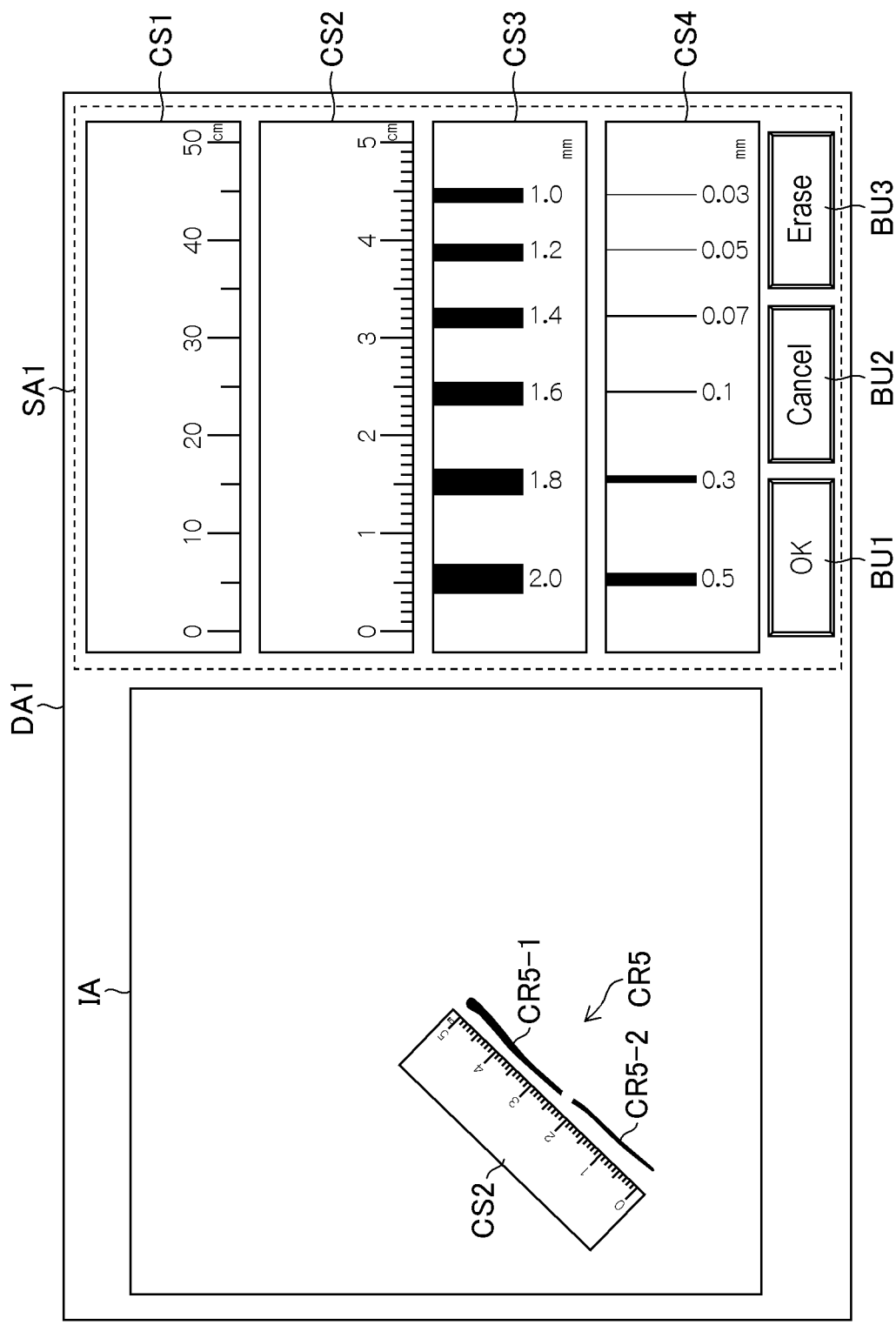
FIG. 16 is still another diagram illustrating an example in which an image of a crack and a scale image are displayed in a superimposed manner.

FIG. 16 is a diagram illustrating a display example of a scale image for a discontinuous crack. In the example of FIG. 16, a crack CR5 splits halfway into cracks CR5-1 and CR5-2. Since the directions of these cracks are substantially the same, one scale image CS2 is displayed.

Figure 17:
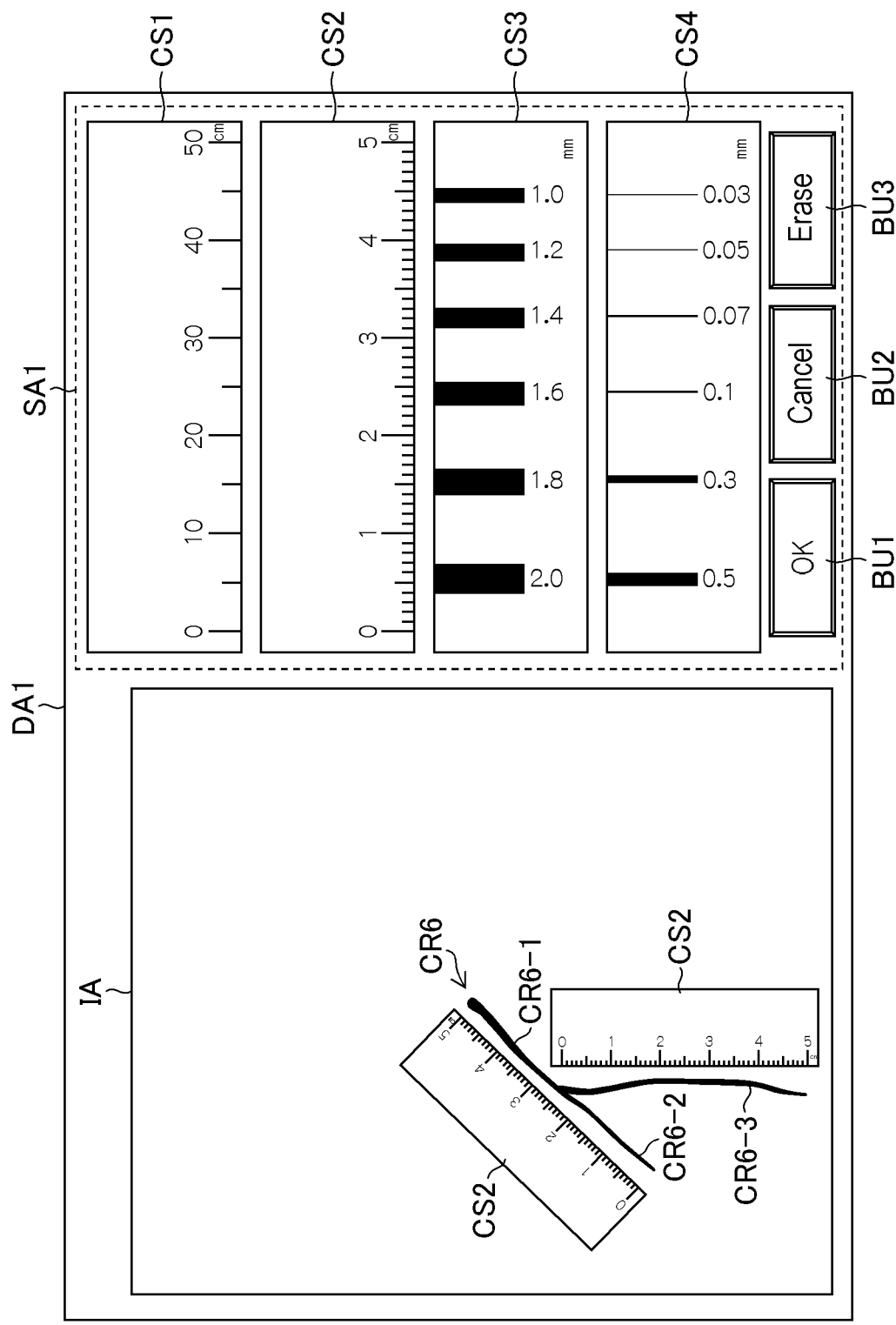
FIG. 17 is still another diagram illustrating an example in which an image of a crack and scale images are displayed in a superimposed manner.

FIG. 17 is a diagram illustrating a display example of scale images for a branching crack. In the example of FIG. 17, a crack CR6-1 of a crack CR6 branches into cracks CR6-2 and CR6-3. Thus, the scale image CS2 is displayed for each of a trunk portion of the crack (the cracks CR6-1 and CR6-2) and a branch portion (the crack CR6-3).

Note that the manner in which the scale image(s) is (are) displayed in a direction along the length direction of the crack(s) is not limited to the examples illustrated in FIGS. 13 to 17. In addition, it may be determined that "the scale image is displayed in a direction along the length direction of a crack" even when the length direction of the crack does not completely match the direction of the scale image, as long as the length of the crack is in a range that can be measured using the scale image or is substantially equal to that range and a rough estimate of the length of the crack can be measured.

Figure 18:
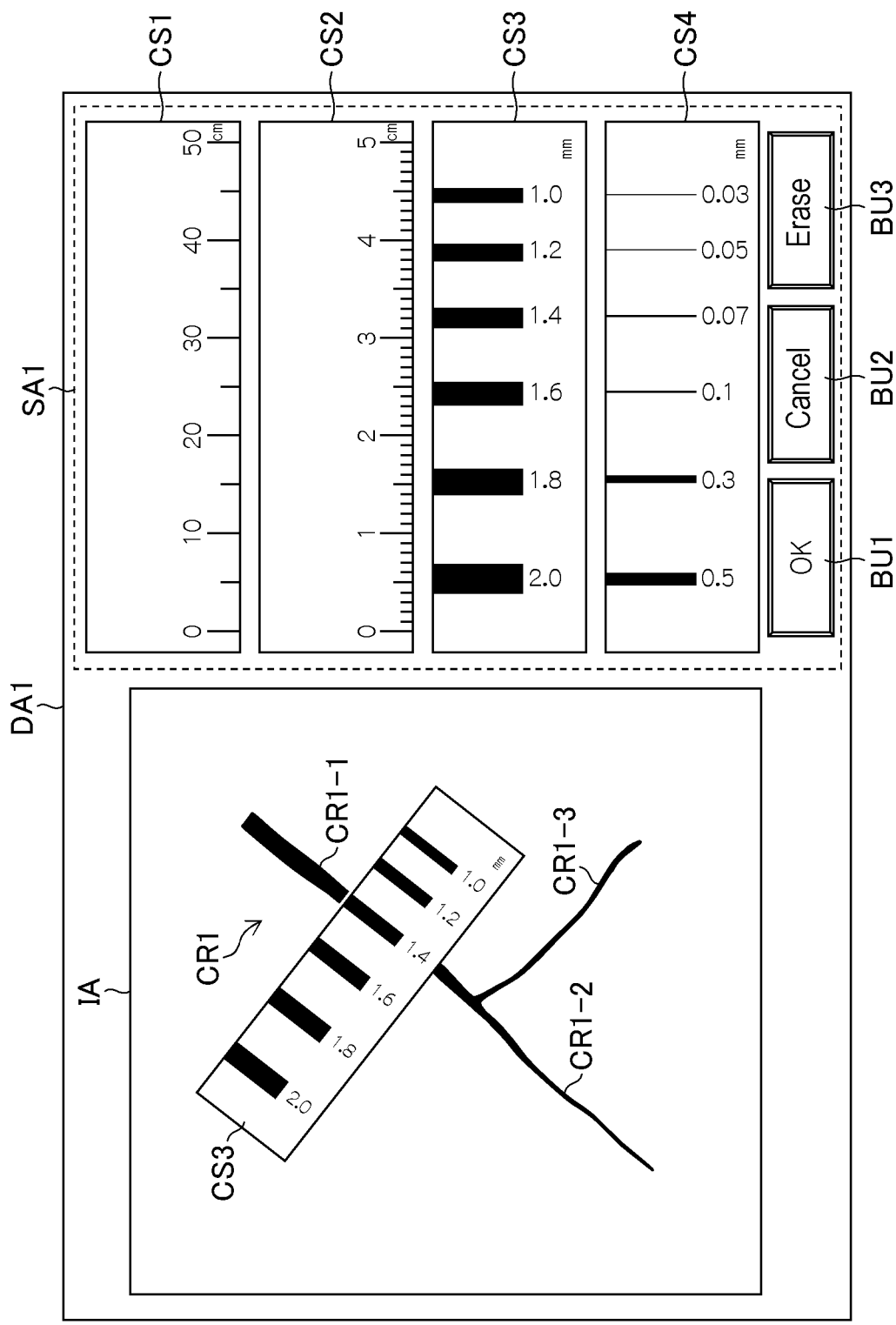
FIG. 18 is still another diagram illustrating an example in which an image of a crack and a scale image are displayed in a superimposed manner.

Manner of Displaying Scale Image in Direction Perpendicular to Direction of Crack FIG. 18 is a diagram illustrating another example in which a captured image and a scale image are displayed in a superimposed manner. FIG. 18 illustrates an example in which the scale image CS3 representing a scale for width measurement is selected and is displayed near the crack CR1-1 in a direction perpendicular to the direction of the crack CR1-1. The width of the crack CR1-1 can be measured by moving the displayed scale image CS3 as needed and by reading the numeral of the line drawing whose width matches the width of the crack.

Figure 19:
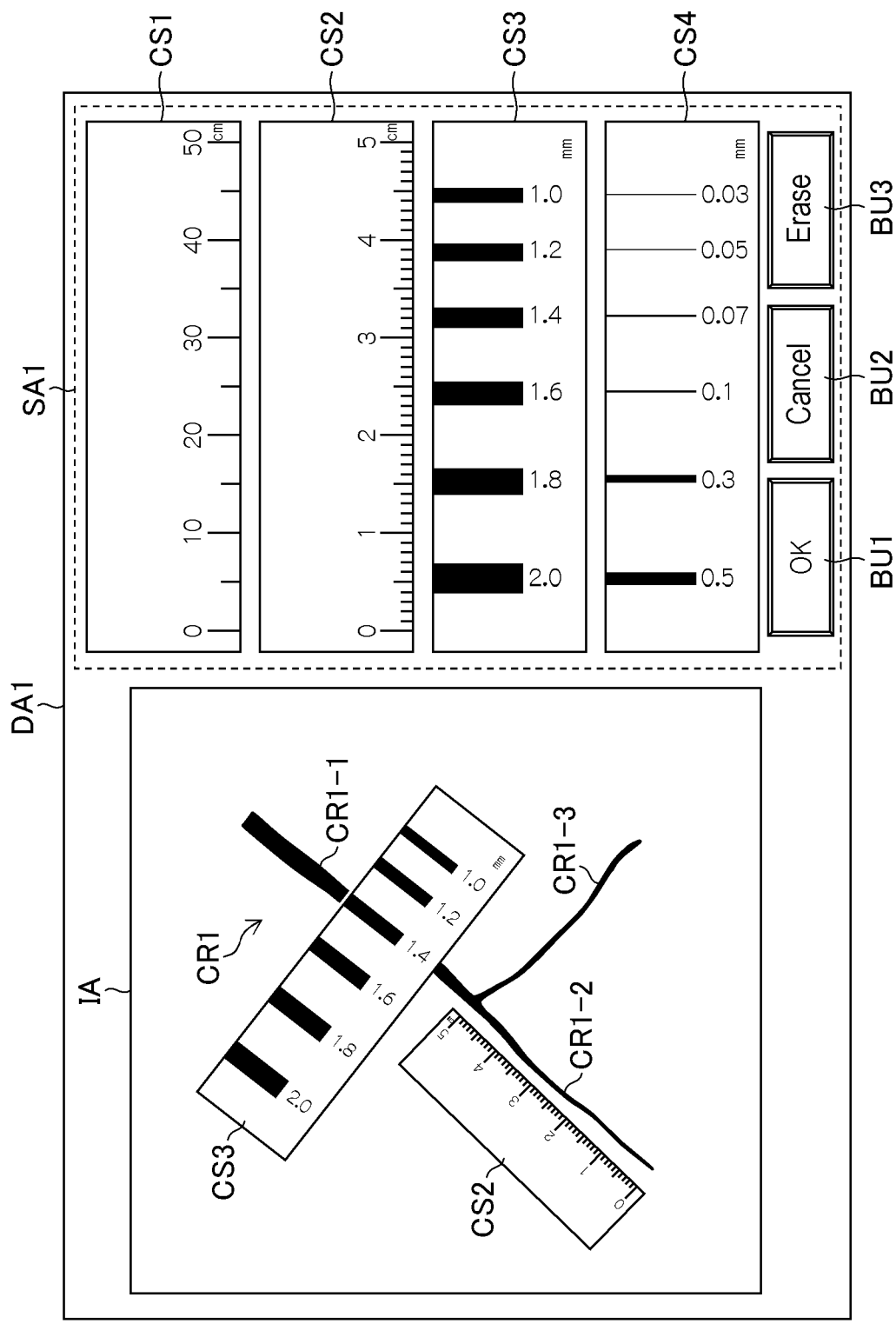
FIG. 19 is still another diagram illustrating an example in which an image of a crack and scale images are displayed in a superimposed manner.

A plurality of scale images may be displayed in the above-described superimposed display. In addition, a scale image for length measurement and a scale image for width measurement may be displayed together. FIG. 19 is a diagram illustrating a state in which the scale image CS2 for length measurement and the scale image CS3 for width measurement are displayed. As described above, measurement can be performed by displaying the appropriate scale image(s) in accordance with the purpose of the measurement and the characteristics of the crack in this embodiment.

In the examples of FIGS. 13 to 19, the image processing unit 108 displays the scale image at a position according to the position of a crack in a direction according to the direction of the crack in a superimposed manner. At that time, the position and the direction of the crack can be determined by extracting the crack from a captured image. The crack can be extracted using various techniques. For example, a crack detection method described in JP2006-162583A can be used. This method is a crack detection method including a step of creating a wavelet coefficient table and creating a wavelet image and a step of distinguishing between a crack area and a non-crack area. In the former step, a wavelet coefficient for two concentrations to be compared is calculated and wavelet coefficients in the case of changing each of the two concentrations are calculated to create a wavelet coefficient table, and wavelet conversion is performed on an input image obtained by capturing an image of a concrete surface, which is a crack detection target, to create a wavelet image. In the latter step, a wavelet coefficient in the wavelet coefficient table for a concentration of a pixel of interest and an average concentration of neighboring pixels in a local area is set as a threshold value, and a crack area and a non-crack area are distinguished between by comparing the wavelet coefficient of the pixel of interest with the threshold value.

A crack can be extracted using a method described in Tomoyuki Yamaguchi, "A Study on Image Processing Method for Crack Inspection of Real Concrete Surfaces", MAJOR IN PURE AND APPLIED PHYSICS, GRADUATE SCHOOL OF SCIENCE AND ENGINEERING, WASEDA UNIVERSITY. February 2008 (hereinafter, referred to as NPL 1) as well as the above-described method described in JP2006-162583A. In the method described in NPL 1, a crack is detected from a surface image by setting an area constituted by pixels having brightness values less than a threshold value as a percolated area (percolation area) and sequentially updating the threshold value in accordance with the shape of the percolation area. Note that a percolation method is in general a method for sequentially spreading an area by mimicking the permeation (percolation) of water in the natural world.

Operation of Image and Displaying of Image Based on Operation of Image

After displaying the captured image and the scale image in step S130, the image processing unit 108 determines whether a user operation on the captured image and/or the scale image is detected (step S140). If a user operation is detected (Yes in step S140), the image processing unit 108 operates the captured image and/or the scale image in accordance with the detection result (step S150) and displays images resulting from the operation (step S160; an image display step). The operation of the images in step S150 and the displaying of the images in step S160 will be described below.

Movement of Scale Image

Figure 20:
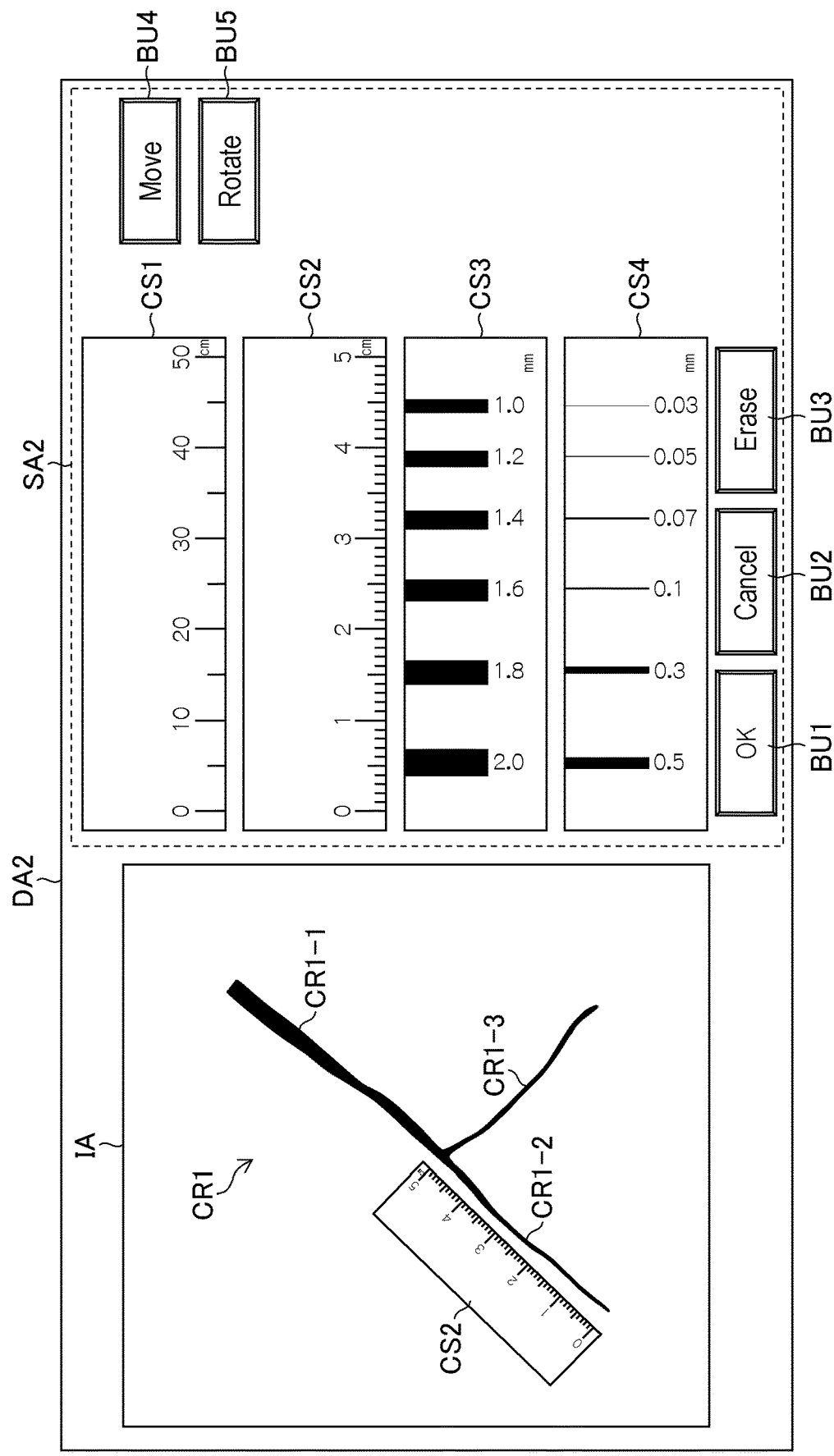
FIG. 20 is a diagram illustrating how a scale image is moved.
Figure 21:
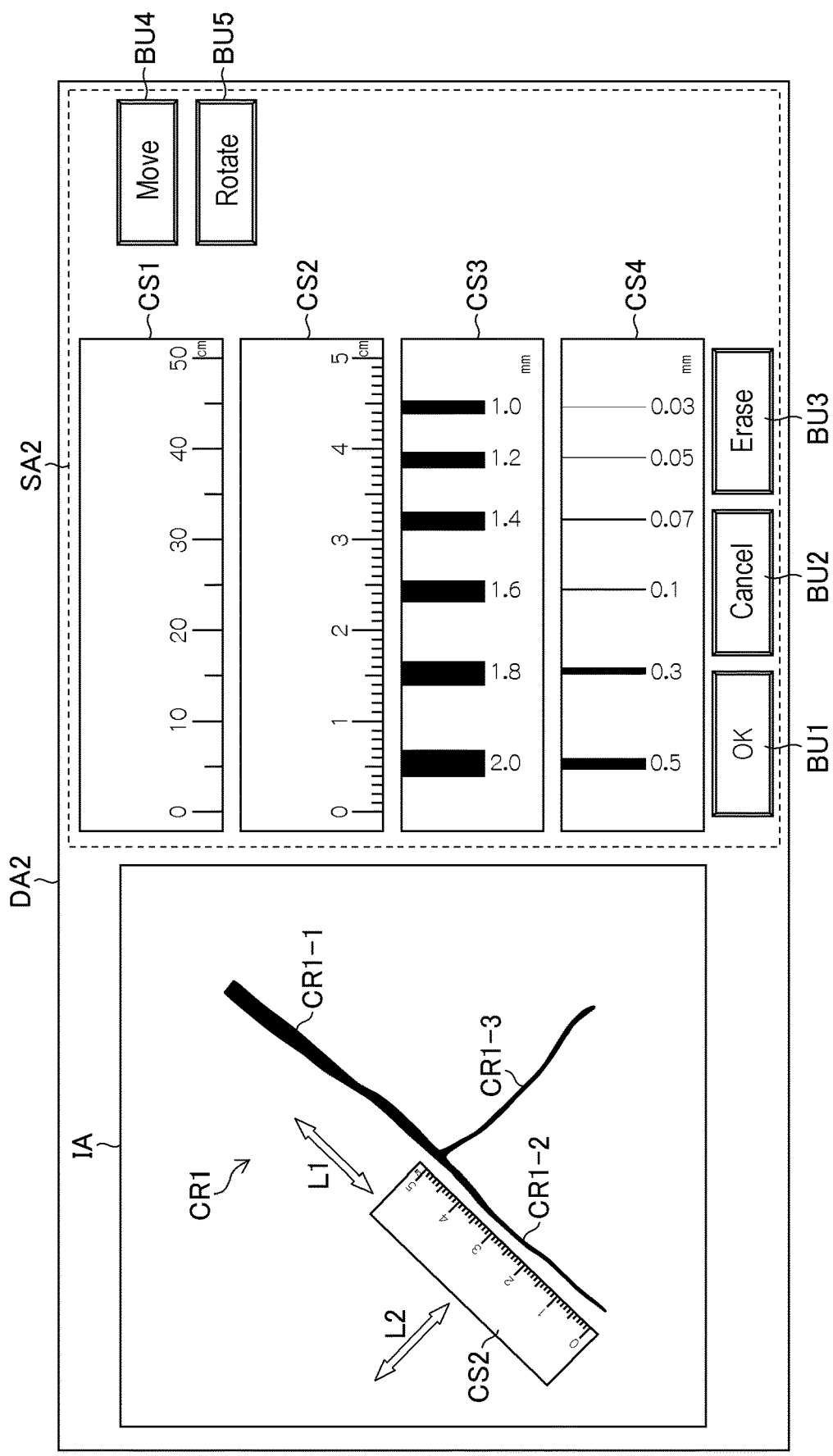
FIG. 21 is another diagram illustrating how the scale image is moved.
Figure 22:
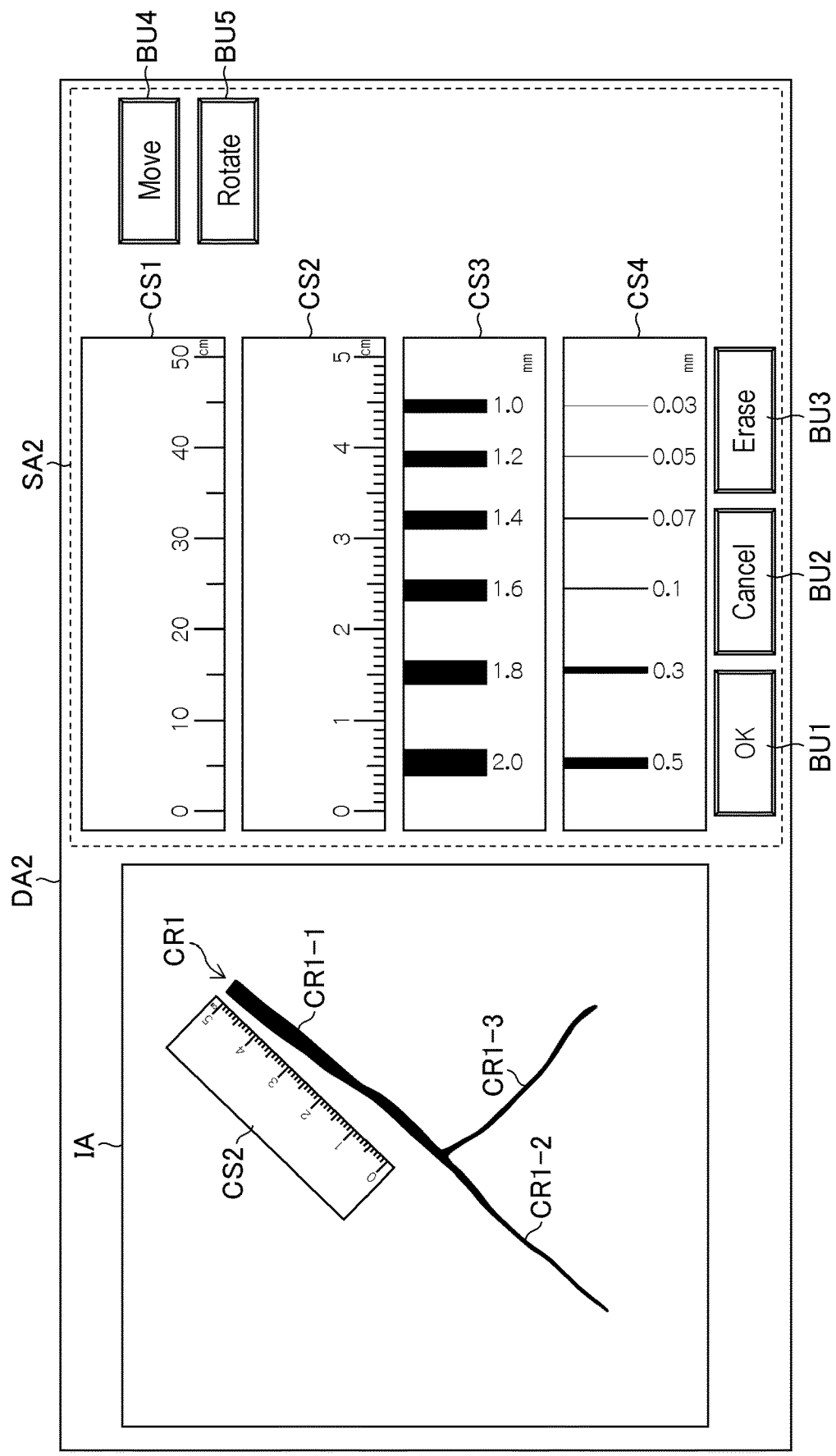
FIG. 22 is still another diagram illustrating how the scale image is moved.

FIGS. 20 to 22 are diagrams illustrating an example of an operation for moving the scale image. Referring to FIGS. 20 to 22, a move button BU4 and a rotate button BU5 for operating the scale image CS2 are displayed in a scale information display area SA2 in a display area DA2. When the move button BU4 is selected in a state in which the scale image CS2 is displayed as illustrated in FIG. 20, the scale image CS2 becomes movable in a length direction L1 and a direction L2 perpendicular to the length direction L1 through an operation performed using a mouse or the like of the operation unit 114 as illustrated in FIG. 21. FIG. 22 is a diagram illustrating a state in which the scale image CS2 is moved to be near the crack CR1-1 in such a way. The image processing unit 108 displays (renders) the scale image CS2 at a position according to the direction and the amount of the movement operation. In this way, the user can perform measurement quickly and easily.

Rotation of Scale Image

Figure 23:
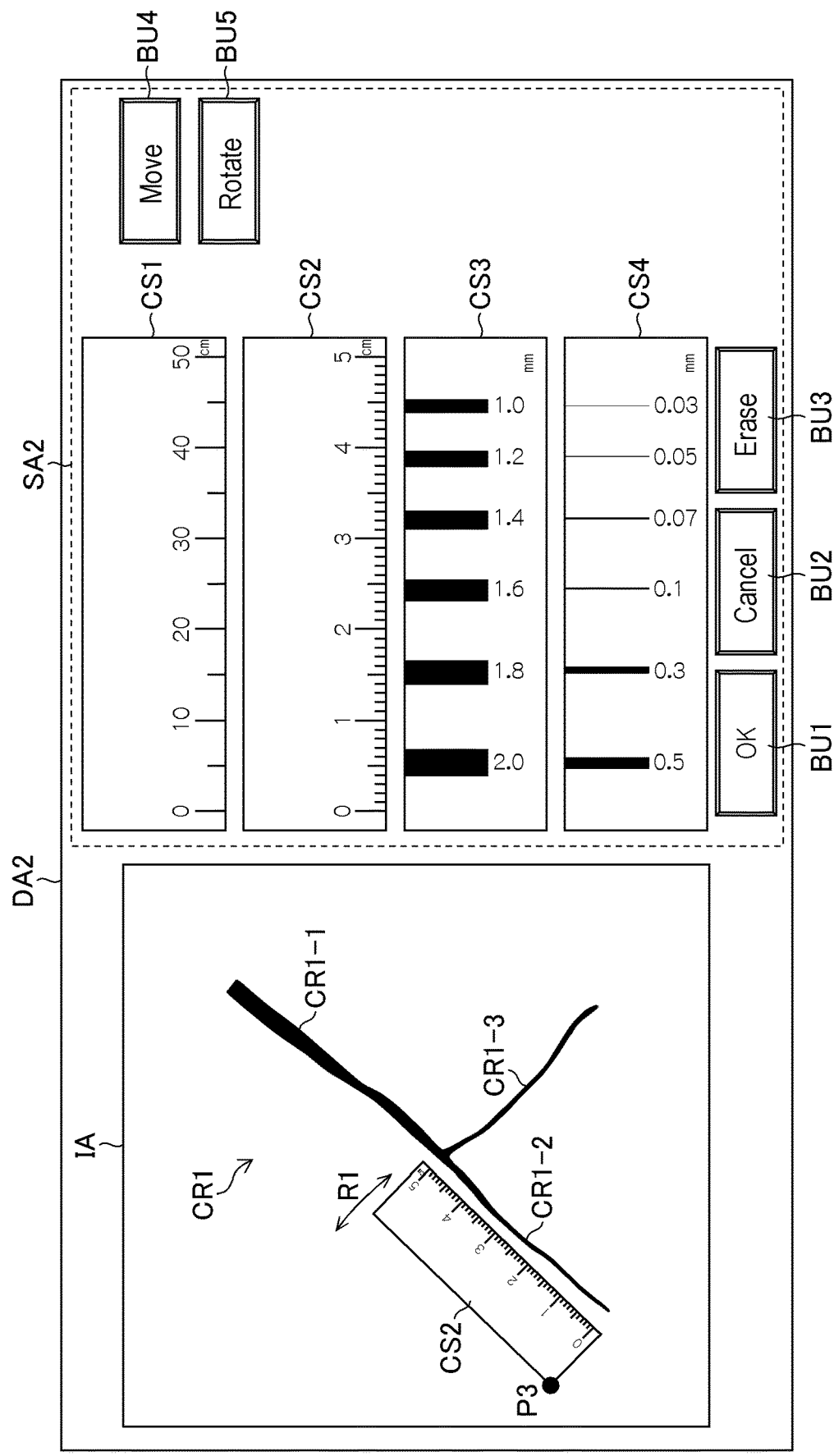
FIG. 23 is a diagram illustrating how a scale image is rotated.
Figure 24:
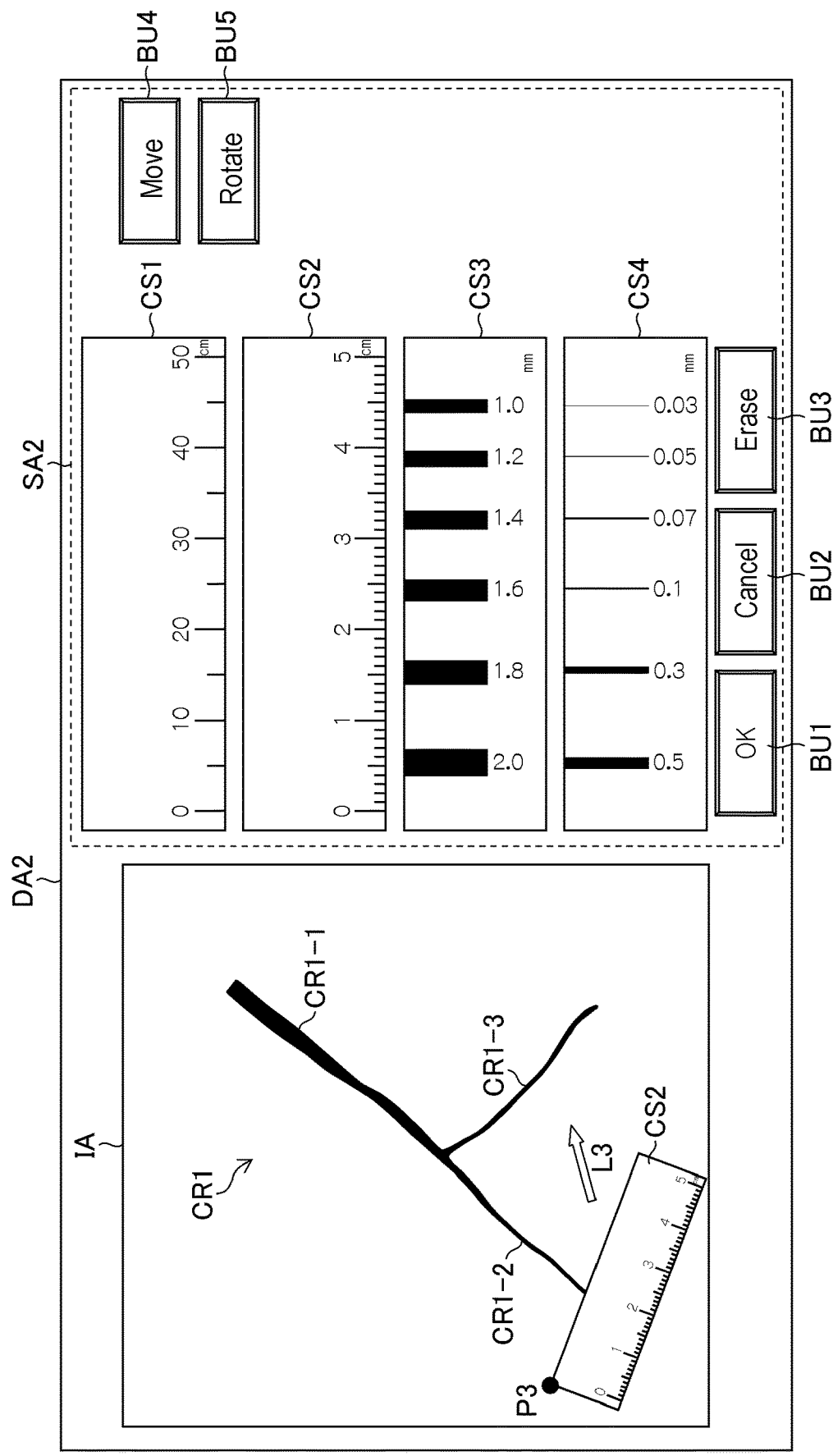
FIG. 24 is another diagram illustrating how the scale image is rotated.
Figure 25:
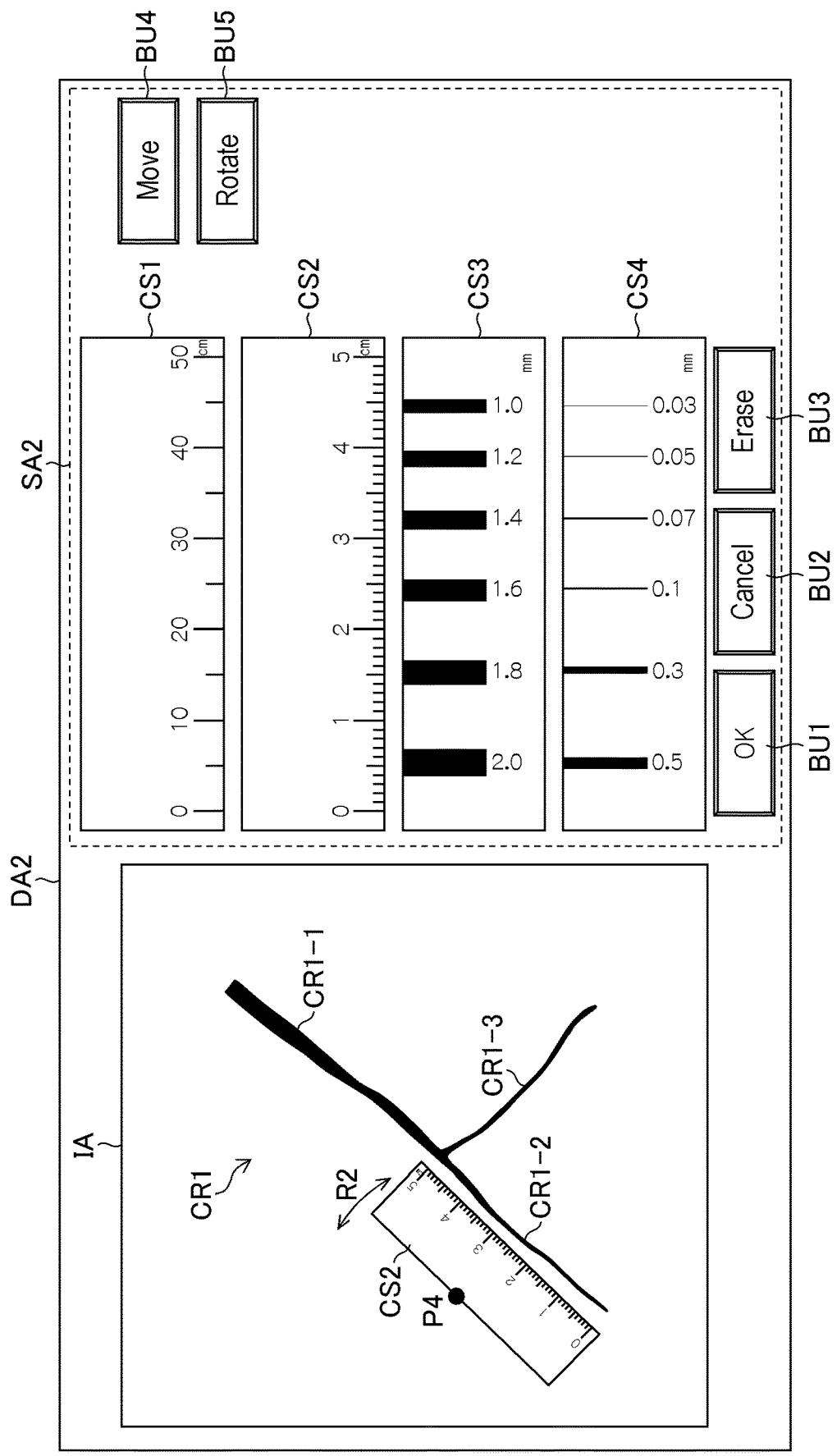
FIG. 25 is still another diagram illustrating how the scale image is rotated.

FIG. 23 is a diagram illustrating an example of an operation for rotating the scale image. When the rotate button BU5 is selected, the scale image CS2 becomes rotatable with respect to a point P3 in a direction of an arrow R1 through an operation performed using the operation unit 114. FIG. 24 is a diagram illustrating a state in which the scale image CS2 is rotated in such a way. The length can be measured by moving the scale image CS2 in a direction L3 as in FIGS. 21 and 22 to be close to the crack CR1-3 from the state illustrated in FIG. 24. Note that the scale image may be rotated with respect to a point in a central portion instead of a point in a corner portion such as the point P3. For example, as illustrated in FIG. 25, the scale image CS2 may be rotated with respect to a point P4 in a central portion of the scale image CS2 in a direction of an arrow R2.

Enlargement of Captured Image

Figure 26:
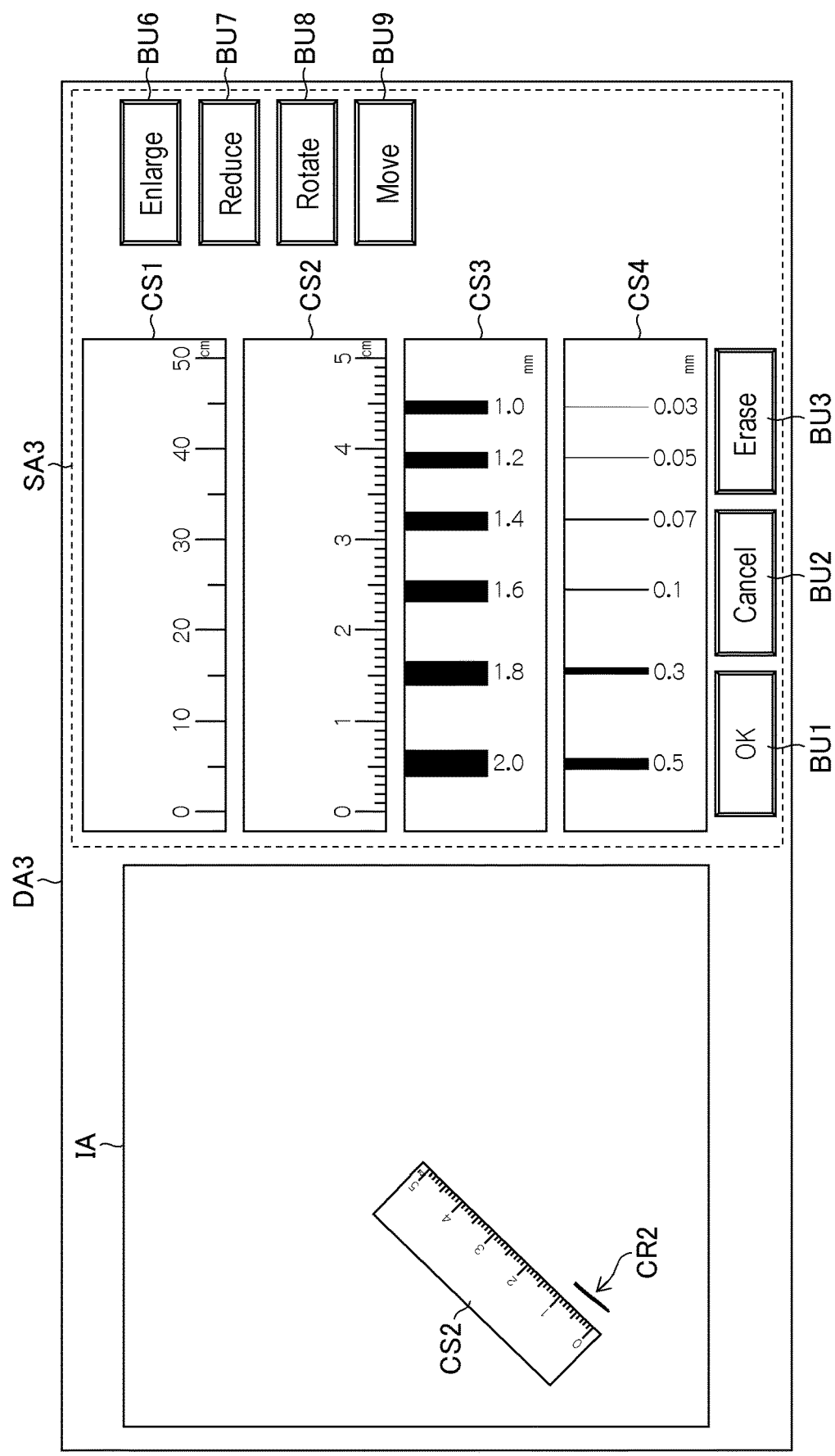
FIG. 26 is a diagram illustrating enlargement of a scale image in response to enlargement of an image.
Figure 27:
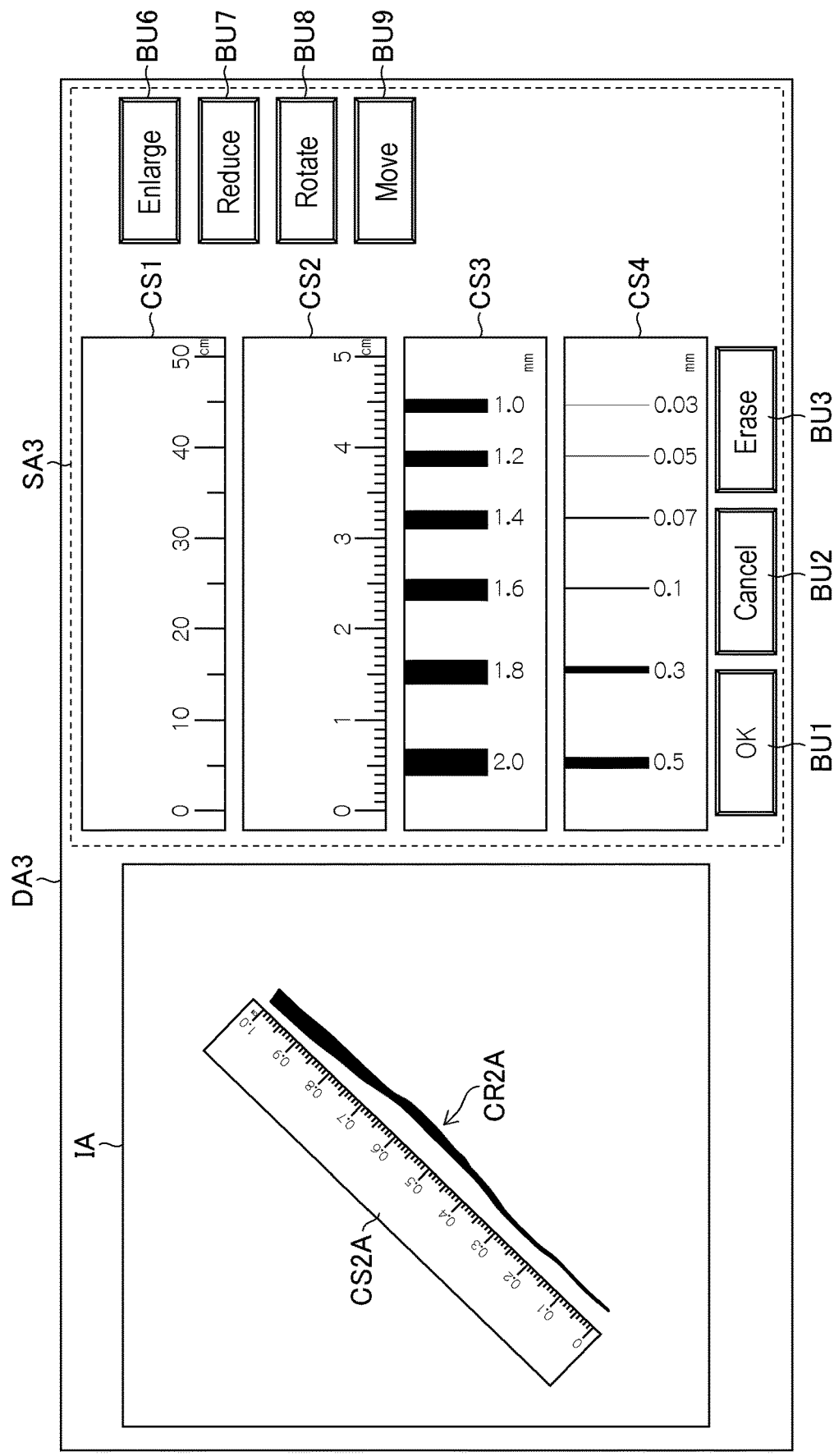
FIG. 27 is another diagram illustrating enlargement of the scale image in response to enlargement of the image.

FIG. 26 is a diagram illustrating an example of an operation for enlarging a captured image. Referring to FIG. 26, an enlarge button BU6, a reduce button BU7, a rotate button BU8, and a move button BU9 for operating a captured image are displayed in a scale information display area SA3 in a display area DA3. When the enlarge button BU6 is selected, the captured image displayed in the image display area IA can be enlarged. FIG. 27 is a diagram illustrating the enlarged captured image, and the crack CR2 displayed in FIG. 26 is enlarged and is displayed as a crack CR2A. In addition, along with such enlargement of the captured image, the scale image CS2 displayed before the enlargement of the captured image is also operated to be enlarged and is displayed as a scale image CS2A. At that time, the gradations and the numerals are changed along with the enlargement of the scale image as illustrated in FIG. 27. As a result of such enlargement of the scale image performed along with the enlargement of the captured image, the user can perform measurement quickly and easily.

Note that operations, such as reduction, other than movement, rotation, and enlargement described above may be performed as operations for the image. In addition, although the description has been given of the case of operating the scale image and the captured image using an operation device such as a mouse in the above examples, the operation of the scale image and the captured image is not limited to such a configuration in the present invention. For example, the display area may be configured using a touch panel and the operation may be performed based on a tap operation or a pinch operation performed by the user.

Recording of Measurement Result

After the operation of the images and the displaying of the images based on the user operation are finished, the image processing unit 108 and the recording unit 110 record the measurement result (step S170). FIG. 28 is a diagram illustrating an example of how a measurement result is recorded. FIG. 28 illustrates an example in which the width (1.4 mm in this example) of the crack CR1-1 at a point P5 is input at an information display area SA4 displayed in a display area DA4. In addition, FIG. 29 illustrates an example in which the length (50 mm in this example) of the crack CR1-2 whose starting point and end point are a point P6 and a point P7, respectively, is input at an information display area SA5 displayed in a display area DA5. In the examples illustrated in these figures, the user can input the length and/or the width of the crack via the operation unit 114. The measurement result input in this manner is recorded in the recording unit 110.

After the measurement result is recorded in step S170, the image processing unit 108 determines whether the measurement is finished (step S180). This determination can be made based on an instruction input by the user via the operation unit 114. If Yes is determined (Yes in step S180), the process proceeds to step S190 in which the measurement result is displayed. If No is determined (No in step S180), the process returns to step S140.

Displaying of Measurement Result

FIG. 30 is a diagram illustrating an example of the measurement result displayed in step S190. Referring to FIG. 30, the measurement results (the width of the crack CR1-1 and the length of the crack CR1-2 in this example) recorded in step S170 are displayed using balloons BA1 and BA2 in the image display area IA of a display area DA6. Such display can be performed as a result of the image processing unit 108 referring to the measurement results recorded in the recording unit 110. Although FIGS. 28 to 30 omit display of the scale images (reduced-size images) and some of the buttons illustrated in FIGS. 12 to 27, these images and buttons may be displayed if necessary.

As described above, the measurement support apparatus 100 and the measurement support method according to the embodiment allow the user to measure a crack quickly and easily. Note that the present invention is not limited to the embodiment described above, and various modifications can be made within a scope not departing from the spirit of the present invention.

REFERENCE SIGNS LIST 1 bridge
2 deck slab
3 main girder
3A joint portion
100 measurement support apparatus
102 image acquisition unit
104 digital camera
104L left image optical system
104R right image optical system
106 image input unit
108 image processing unit
110 recording unit
112 display unit
114 operation unit
BA1 balloon
BA2 balloon
BU1 OK button
BU2 cancel button
BU3 erase button
BU4 move button
BU5 rotate button
BU6 enlarge button
BU7 reduce button
BU8 rotate button
BU9 move button
CR1 crack
CR1-1 crack
CR1-2 crack
CR1-3 crack
CR2 crack
CR2A crack
CR3 crack
CR3-1 crack
CR3-2 crack
CR4 crack
CR4-1 crack
CR4-2 crack
CR5 crack
CR5-1 crack
CR5-2 crack
CR6 crack
CR6-1 crack
CR6-2 crack
CR6-3 crack
CS1 scale image
CS10A scale image
CS10B scale image
CS11 scale image
CS2 scale image
CS20 scale image
CS20A scale image
CS3 scale image
CS4 scale image
D1 image-capturing direction
D2 image-capturing direction
DA1 display area
DA2 display area
DA3 display area
DA4 display area
DA5 display area
DA6 display area
E1 measurement surface
F1 end portion
IA image display area
L1 direction
L2 direction
R1 arrow
R2 arrow
S100-S190 steps of measurement method
SA1 scale information display area
SA2 scale information display area
SA3 scale information display area
SA4 information display area
SA5 information display area
i1 captured image
i2 captured image
i3 captured image
$\theta1$ angle
$\theta2$ angle

What is claimed is:

1. A measurement support apparatus comprising:
an image acquisition circuit that acquires an image of a structure;

a scale image generation circuit that generates a scale image used to measure a crack caused on a measurement surface of the structure, the scale image representing a scale assigned at least one of gradations for measuring a length of the crack or line drawings and numerals for measuring a width of the crack; and an image display that displays the image of the structure and the scale image in a superimposed manner in a display area, wherein the scale image generation circuit generates a scale image in accordance with a distance between the image acquisition circuit and the measurement surface and an orientation of the measurement surface, and the image display displays the generated scale image in the superimposed manner at a position according to a position of the crack in the image of the structure in a direction according to a direction of the crack in the image of the structure.

2. The measurement support apparatus according to claim 1, wherein the scale image generation circuit generates a scale image representing a scale of a type, a shape, and a size according to the distance and the orientation.

3. The measurement support apparatus according to claim 2, wherein the gradations, the line drawings, and the numerals of the scale represented by the scale image change depending on the type, the shape, and the size.

4. The measurement support apparatus according to claim 1, wherein the image display displays the scale image in a direction of the crack or in a direction perpendicular to the direction of the crack.

5. The measurement support apparatus according to claim 1, comprising: an image operation circuit that operates the image of the structure and the scale image in accordance with an input by a user.

6. The measurement support apparatus according to claim 5, wherein the image operation circuit operates the scale image along with an operation performed by the image operation circuit on the image of the structure.

7. The measurement support apparatus according to claim 1, wherein the display area includes an image display area in which the image of the structure and the scale image are displayed and a scale information display area in which a plurality of pieces of scale information representing scales of types that are displayable in the image display area are displayed, and the image display displays, in the image display area, a scale image corresponding to a piece of scale information selected from among the plurality of pieces of scale information displayed in the scale information display area.

8. The measurement support apparatus according to claim 1, comprising: an optical system that acquires a stereo image of the structure as the image of the structure; and an image processing circuit that calculates the distance and the orientation based on the acquired stereo image.

9. The measurement support apparatus according to claim 8, wherein the image processing circuit detects the position and the direction of the crack from the stereo image, and the image display displays the scale image based on the detected portion and direction.

10. The measurement support apparatus according to claim 1, wherein the image display displays the generated scale image in the superimposed manner at a position and a direction according to an angle of the crack in the image of the structure.

11. The measurement support apparatus according to claim 10, wherein the image display displays one generated scale image in the superimposed manner when the angle is less than a threshold value.

12. The measurement support apparatus according to claim 10, wherein the image display displays two or more generated scale images in the superimposed manner when the angle is a threshold value or more.

13. A measurement support method comprising:

acquiring an image of a structure using an image acquisition device;

generating a scale image used to measure a crack caused on a measurement surface of the structure, the scale image representing a scale assigned at least one of gradations for measuring a length of the crack or line drawings and numerals for measuring a width of the crack; and displaying the image of the structure and the scale image in a superimposed manner in a display area, wherein in generating the scale image, a scale image is generated in accordance with a distance between the image acquisition device and the measurement surface and an orientation of the measurement surface, and in displaying the image, the generated scale image is displayed in the superimposed manner at a position according to a position of the crack in the image of the structure in a direction according to a direction of the crack in the image of the structure.

* * * * *